(12) United States Patent
Sakai

(10) Patent No.: US 8,510,623 B2
(45) Date of Patent: Aug. 13, 2013

(54) ENCODER, TRANSMISSION DEVICE, AND ENCODING PROCESS

(75) Inventor: Yuki Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 619 days.

(21) Appl. No.: 12/479,426

(22) Filed: Jun. 5, 2009

(65) Prior Publication Data

US 2010/0054360 A1    Mar. 4, 2010

(30) Foreign Application Priority Data

Aug. 27, 2008  (JP) ................................. 2008-218167

(51) Int. Cl.
*H03M 13/00*    (2006.01)

(52) U.S. Cl.
USPC .......................................................... 714/755

(58) Field of Classification Search
USPC .......................................................... 714/755
See application file for complete search history.

(56) References Cited

U.S. PATENT DOCUMENTS

| | | | | |
|---|---|---|---|---|
| 5,999,905 | A * | 12/1999 | Isozaki | 704/500 |
| 6,775,274 | B1 * | 8/2004 | Ain et al. | 370/360 |
| 7,979,780 | B2 * | 7/2011 | Kamiya | 714/781 |
| 2002/0007474 | A1 * | 1/2002 | Fujita et al. | 714/755 |
| 2002/0021763 | A1 | 2/2002 | Le Dantec | |
| 2003/0043905 | A1 * | 3/2003 | Nakayama et al. | 375/240.04 |
| 2003/0101401 | A1 * | 5/2003 | Salvi et al. | 714/755 |
| 2003/0140304 | A1 * | 7/2003 | Hurt et al. | 714/786 |
| 2004/0025104 | A1 | 2/2004 | Amer | |

FOREIGN PATENT DOCUMENTS

| | | |
|---|---|---|
| JP | 2000278144 | 10/2000 |
| JP | 2000286720 | 10/2000 |
| JP | 2001352251 A | 12/2001 |
| JP | 2002171172 | 6/2002 |
| JP | 2004215310 | 7/2004 |
| JP | 2005286623 A | 10/2005 |
| JP | 2005535190 A | 11/2005 |
| JP | 2007036869 | 2/2007 |

OTHER PUBLICATIONS

Japanese Office Action dated Nov. 8, 2011 issued in 2008—218167.

* cited by examiner

*Primary Examiner* — Albert Decady
*Assistant Examiner* — Enam Ahmed
(74) *Attorney, Agent, or Firm* — Smith, Gambrell & Russell, LLP

(57) ABSTRACT

An encoder for successively receiving a plurality of data blocks and encoding each of the plurality of data blocks includes a plurality of element encoding units and a switch unit. The switch unit distributes each of the plurality of data blocks among the plurality of element encoding units. The plurality of element encoding units determine initial states of the plurality of element encoding units by using the plurality of data blocks, and encode the plurality of data blocks on the basis of the initial states.

9 Claims, 18 Drawing Sheets

| N_mod7 | $S_C$ | | | | | | | |
|---|---|---|---|---|---|---|---|---|
| | $SO_{N-1}=0$ | $SO_{N-1}=1$ | $SO_{N-1}=2$ | $SO_{N-1}=3$ | $SO_{N-1}=4$ | $SO_{N-1}=5$ | $SO_{N-1}=6$ | $SO_{N-1}=7$ |
| 1 | 0 | 6 | 4 | 2 | 7 | 1 | 3 | 5 |
| 2 | 0 | 3 | 7 | 4 | 5 | 6 | 2 | 1 |
| 3 | 0 | 5 | 3 | 6 | 2 | 7 | 1 | 4 |
| 4 | 0 | 4 | 1 | 5 | 6 | 2 | 7 | 3 |
| 5 | 0 | 2 | 5 | 7 | 1 | 3 | 4 | 6 |
| 6 | 0 | 7 | 6 | 1 | 3 | 4 | 5 | 2 |

ENCODER, TRANSMISSION DEVICE, AND ENCODING PROCESS

CROSS-REFERENCE TO RELATED APPLICATIONS

This application is based upon and claims the benefits of priority of the prior Japanese Patent Application No. 2008-218167, filed on Aug. 27, 2008, the entire contents of which are incorporated herein by reference.

FIELD

The embodiments discussed herein relate to an encoder, a transmission device, and an encoding process.

BACKGROUND

Currently, various communication systems including wireless communication systems (such as mobile telephone systems and wireless LAN systems) are being used. (LAN stands for local area network.) In the communication systems, bit errors can occur when signals are transmitted through transmission lines. In order to compensate for the bit errors, it is possible to use the error-correcting coding technology in transmission devices and reception devices. The transmission devices convert data into error-correcting codes, and transmit the error-correcting codes. The reception devices receive and decode the error-correcting codes. Even when the received data contain bit errors, bit errors not exceeding a certain level can be corrected in the decoding process.

Some types of error-correcting codes such as convolutional codes (CC) and convolutional turbo codes (CTC) are generated by convolutional encoding. The internal state of an encoder performing convolutional encoding transitions on the basis of an input signal, and the output signal of the encoder is determined on the basis of the input signal before being encoded and the internal state of the encoder. That is, the output signal of the encoder outputted in response to an input signal depends on one or more input signals previously inputted into the encoder as well as the current input signal. The convolutional encoded data can be decoded, for example, by using the Viterbi decoding algorithm. (See, for example, Japanese Laid-open Patent Publication No. 2000-278144.)

In some types of convolutional encoding, a plurality of operations are performed on a data block (which is a unit of data to be encoded). For example, according to the tail-biting convolutional encoding, in order to allow the cyclic state transition, the final state of the encoder is determined by preliminarily encoding the data block as preprocessing, and then the initial state is determined on the basis of the final state. Thereafter, the same data block is encoded again by using the determined initial state, and the encoded data block is outputted.

As described above, the calculational load of the convolution can become heavy. If a great number of data blocks to be encoded are inputted into an encoder in a short time, the encoder cannot encode the great number of data blocks on a real-time basis, so that the encoding can be delayed or a buffer overflow can occur.

SUMMARY

According to the present invention, an encoder for successively receiving a plurality of data blocks and encoding each of the plurality of data blocks is provided. The encoder includes a plurality of element encoding units and a switch unit. The plurality of element encoding units determine initial states of the plurality of element encoding units by using the plurality of data blocks, and encode the plurality of data blocks on the basis of the initial states. The switch unit distributes each of the plurality of data blocks among the plurality of element encoding units.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 7 illustrates the data structure of an example of an initial-value table;

FIG. 18 is a block diagram illustrating the construction of a variation of the encoding unit according to the third embodiment in which a part of the element encoding units is dispensed with.

DESCRIPTION OF EMBODIMENT(S)

The embodiments will be explained below with reference to the accompanying drawings, wherein like reference numbers refer to like elements throughout.

Typical Encoder

Figure 1:
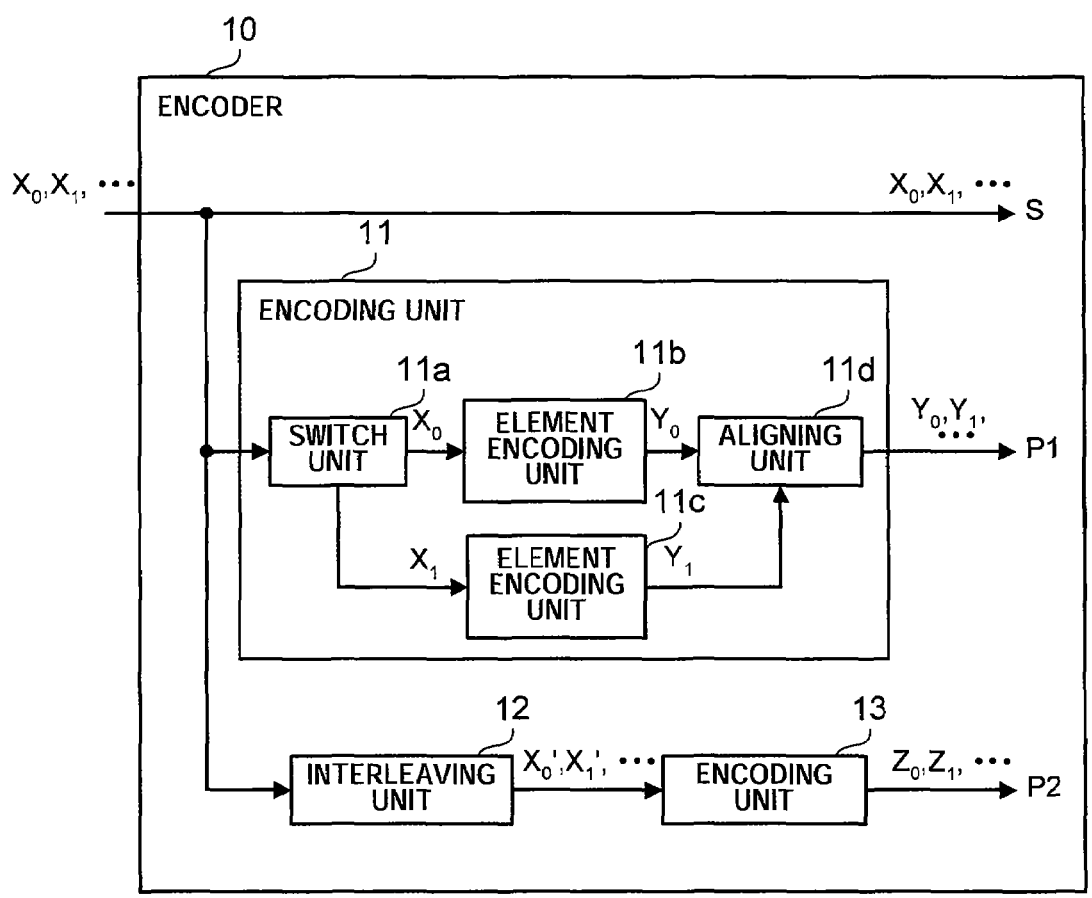
FIG. 1 illustrates a construction typical for the encoders according to the first, second, and third embodiments.

FIG. 1 illustrates a construction typical for the encoders according to the first, second, and third embodiments. The encoder 10 successively receives data blocks, encodes each of the received data blocks, and successively outputs the encoded data blocks, where the data blocks are units of data to be encoded. The series of data blocks inputted into the encoder 10 is represented as $X=\{X_0, X_1, \ldots\}$, where the subscript indicates the order of the input. The encoder 10 comprises encoding units 11 and 13 and an interleaving unit 12.

The encoding unit 11 encodes each of the data blocks inputted into the encoder 10 so as to generate a series of data blocks $Y=\{Y_0, Y_1, \ldots\}$, where the data block $Y_0$ is the result of the encoding of the data block $X_0$, and the data block $Y_1$ is the result of the encoding of the data block $X_1$. The encoding unit 11 comprises a switch unit 11a, element encoding units 11b and 11c, and an aligning unit 11d.

The switch unit 11a distributes each of the data blocks inputted into the encoder 10, to one of the element encoding units in a time shared manner. For example, the switch unit 11a alternately switches the destination of the output between the element encoding units in a time shared manner so as to output the even-numbered data blocks (e.g., the data block $X_0$) to the element encoding unit 11b, and the odd-numbered data blocks (e.g., the data block $X_1$) to the element encoding unit 11c.

Each of the element encoding units 11b and 11c encodes a data block distributed from the switch unit 11a. Specifically, the element encoding units 11b and 11c perform convolutional encoding. First, each element encoding unit determines the initial state corresponding to the inputted data block, by using the determined initial state. For example, it is possible to obtain the final state by preprocessing (preliminarily encoding) the data block in accordance with the same algorithm as the main encoding, and then obtain the initial state on the basis of the final state. The determination of the initial state and the encoding may be performed in a time shared manner. Alternatively, it is possible to separately arrange a calculation circuit for determination of the initial state and a calculation circuit for the main encoding, and perform pipeline processing.

The aligning unit 11d receives the data blocks encoded by and successively outputted from the element encoding units 11b and 11c, arranges the encoded data blocks into an order corresponding to the order in which the series X of data blocks are inputted into the encoder 10, and outputs the series Y of the encoded data blocks.

The interleaving unit 12 performs interleaving of each of the data blocks inputted into the encoder 10. In the interleaving, the interleaving unit 12 changes the order of the bits contained in each data block in accordance with a predetermined rule. Then, the interleaving unit 12 successively outputs the interleaved data blocks to the encoding unit 13. The series of the interleaved data blocks are represented as $X'=\{X_0', X_1', \ldots\}$.

The encoding unit 13 receives the interleaved data blocks from the interleaving unit 12, encodes each of the interleaved data blocks, and outputs a series of interleaved and encoded data blocks $Z=\{Z_0, Z_1, \ldots\}$. That is, the data block $Z_0$ is the encoded result of the interleaved data block $X_0'$, and the data block $Z_1$ is the encoded result of the interleaved data block $X_1'$. The encoding unit 13 can be realized by a construction similar to the encoding unit 11. However, the encoding unit 13 may have a different construction from the encoding unit 11. For example, the encoding unit 13 may have only one element encoding unit. The encoding units 11 and 13 may perform the convolutional encoding in either identical or different manners.

For example, the encoder 10 of FIG. 1 can be used as a turbo encoder having the basic coding rate of ⅓. In this case, the encoder 10 can use the output Y of the encoding unit 11 as first parity P1, and the output Z of the encoding unit 13 as second parity P2. The encoder 10 outputs as encoded data the set of the systematic data S (which is identical to the data inputted to the encoder 10), the first parity P1, and the second parity P2.

When the encoder 10 having the above construction successively receives data blocks, the switch unit 11a distributes the received data blocks to the element encoding units 11b and 11c in a time shared manner. Then, each of the element encoding units 11b and 11c performs convolutional encoding of each of the data blocks received by the element encoding unit. Therefore, even when a great amount of data blocks to be encoded are inputted into the encoder 10 in a short time, the encoder 10 can encode the data blocks with high throughput. Therefore, it is possible to prevent coding delay and overflow of a buffer memory which stores data blocks to be processed.

When the amount of data blocks inputted into the encoder 10 in a unit time is small, (for example, when the amount of data blocks inputted into the encoder 10 in a unit time is smaller than a predetermined threshold value), it is possible to stop operations of part of the element encoding units 11b and 11c. For example, when the amount of data blocks inputted into the encoder 10 in a unit time is small, it is possible to deliver all the data blocks to the element encoding unit 11b, and power off the element encoding unit 11c. That is, the encoder 10 can operate in a power-saving mode when the amount of data blocks inputted into the encoder 10 in a unit time is small, and in a high-throughput mode when the amount of data blocks inputted into the encoder 10 in a unit time is great.

Hereinbelow, details of the embodiments of the encoders which basically operate in similar manners to the encoder 10 of FIG. 1 and are used in a wireless communication system are explained.

First Embodiment

The first embodiment is explained in detail below.

Mobile Station

Figure 2:
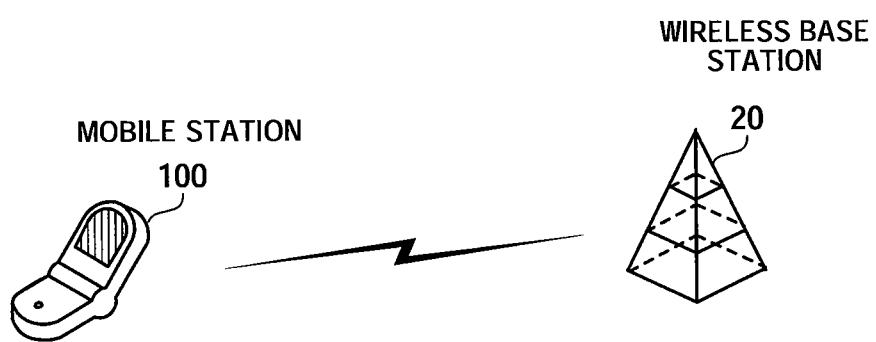
FIG. 2 illustrates an example of a configuration of a wireless communication system according to the first embodiment.

FIG. 2 illustrates the configuration of an example of a wireless communication system according to the first embodiment. The wireless communication system of FIG. 2 comprises a wireless base station 20 and a mobile station 100, which perform wireless communication with each other. That is, the wireless base station 20 is a communication device which performs wireless communication with the mobile station 100, and the mobile station 100 is a communication device (e.g., a mobile telephone) which performs wireless communication with the wireless base station 20.

The wireless base station 20 and the mobile station 100 compensate for bit errors contained in received data, where the bit errors are caused by noise on a transmission line. The technique of detection and correction of errors by a receiver based on the parity contained in the received data is called the forward error correction (FEC). The wireless base station 20 and the mobile station 100 encode data to be transmitted (transmission data), in data blocks having a predetermined size. The data blocks are hereinafter referred to as FEC blocks. The size of each FEC block is, for example, 60 bytes (=480 bits).

Figure 3:
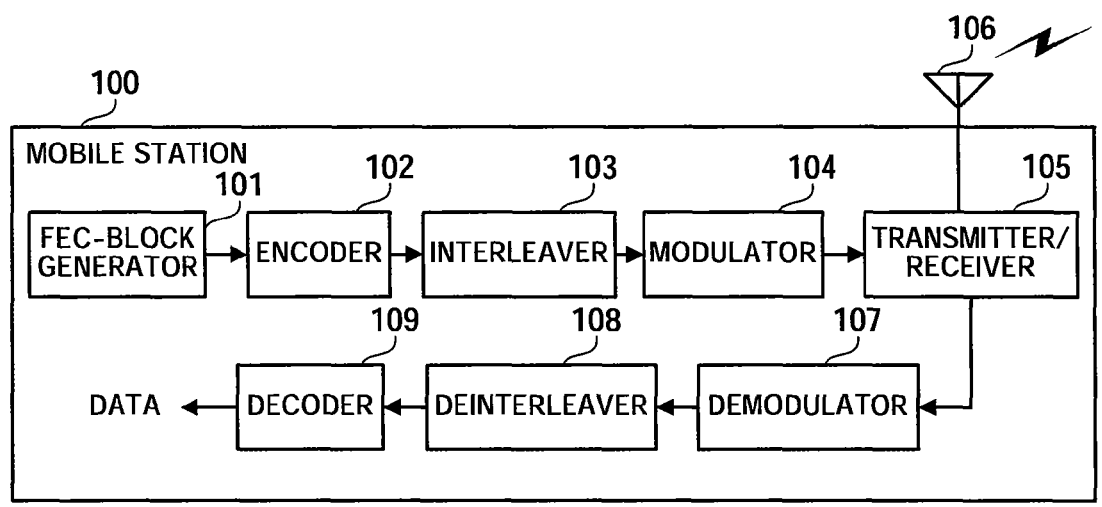
FIG. 3 is a block diagram illustrating the construction of a mobile station according to the first embodiment.

Next, the construction of the mobile station 100 are explained. Although not explained, the wireless base station 20 can also be realized by a similar construction to the mobile station 100. FIG. 3 is a block diagram illustrating the construction of the mobile station 100 according to the first embodiment. The mobile station 100 comprises an FEC-block generator 101, an encoder 102, an interleaver 103, a modulator 104, a transmitter/receiver 105, an antenna 106, a demodulator 107, a deinterleaver 108, and a decoder 109.

The FEC-block generator 101 divides the transmission data into FEC blocks, and outputs the FEC blocks to the encoder 102. The encoder 102 is a turbo convolutional encoder which acquires the FEC blocks from the FEC-block generator 101, encodes the acquired FEC blocks into error-correcting codes, and generates encoded FEC blocks (which may be hereinafter referred to as encoded blocks). Further, it is possible to improve the performance in the compensation for data transmission error by performing error-detection encoding in advance of the error-correcting code. The encoder 102 outputs the encoded blocks to the interleaver 103.

The interleaver 103 receives the encoded blocks from the encoder 102, performs the interleaving of the encoded blocks, assigns the interleaved encoded blocks to a wireless resource, and generates data in wireless frames for wireless transmission. Hereinafter, the data in wireless frames are referred to as wireless-frame data. The order of the bits constituting each encoded block along a frequency axis or a time axis of the wireless resource is changed by the interleaving in accordance with a predetermined rule. Then, the interleaver 103 outputs the above wireless-frame data to the modulator 104.

The modulator 104 receives the wireless-frame data from the interleaver 103, modulates the wireless-frame data in accordance with a predetermined modulation technique so as to produce a modulated signal, and outputs the modulated signal to the transmitter/receiver 105.

The transmitter/receiver 105 receives the modulated signal from the modulator 104, performs frequency conversion of the modulated signal so as to produce a transmission signal, and outputs the transmission signal to the antenna 106. In addition, the transmitter/receiver 105 receives a wireless signal through the antenna 106, performs frequency conversion of the received wireless signal so as to produce a modulated signal, and outputs the modulated signal to the demodulator 107.

The antenna 106 is an antenna for common use in transmission and reception. The antenna 106 wirelessly outputs the transmission signal outputted from the transmitter/receiver 105. In addition, the antenna 106 receives a wireless signal, and outputs the received wireless signal to the transmitter/receiver 105.

The demodulator 107 receives a modulated signal from the transmitter/receiver 105, demodulates the modulated signal in accordance with a predetermined demodulation technique so as to obtain wireless-frame data, and outputs the wireless-frame data to the deinterleaver 108.

The deinterleaver 108 receives the wireless-frame data from the demodulator 107, performs deinterleaving of the wireless-frame data, extracts encoded blocks, and outputs the encoded blocks to the decoder 109. The decoder 109 is a turbo decoder corresponding to the encoder 102. The decoder 109 receives the encoded blocks from the deinterleaver 108, and repeatedly performs error correction of the encoded blocks in accordance with a Viterbi algorithm so as to reproduce original data.

Encoder

Figure 4:
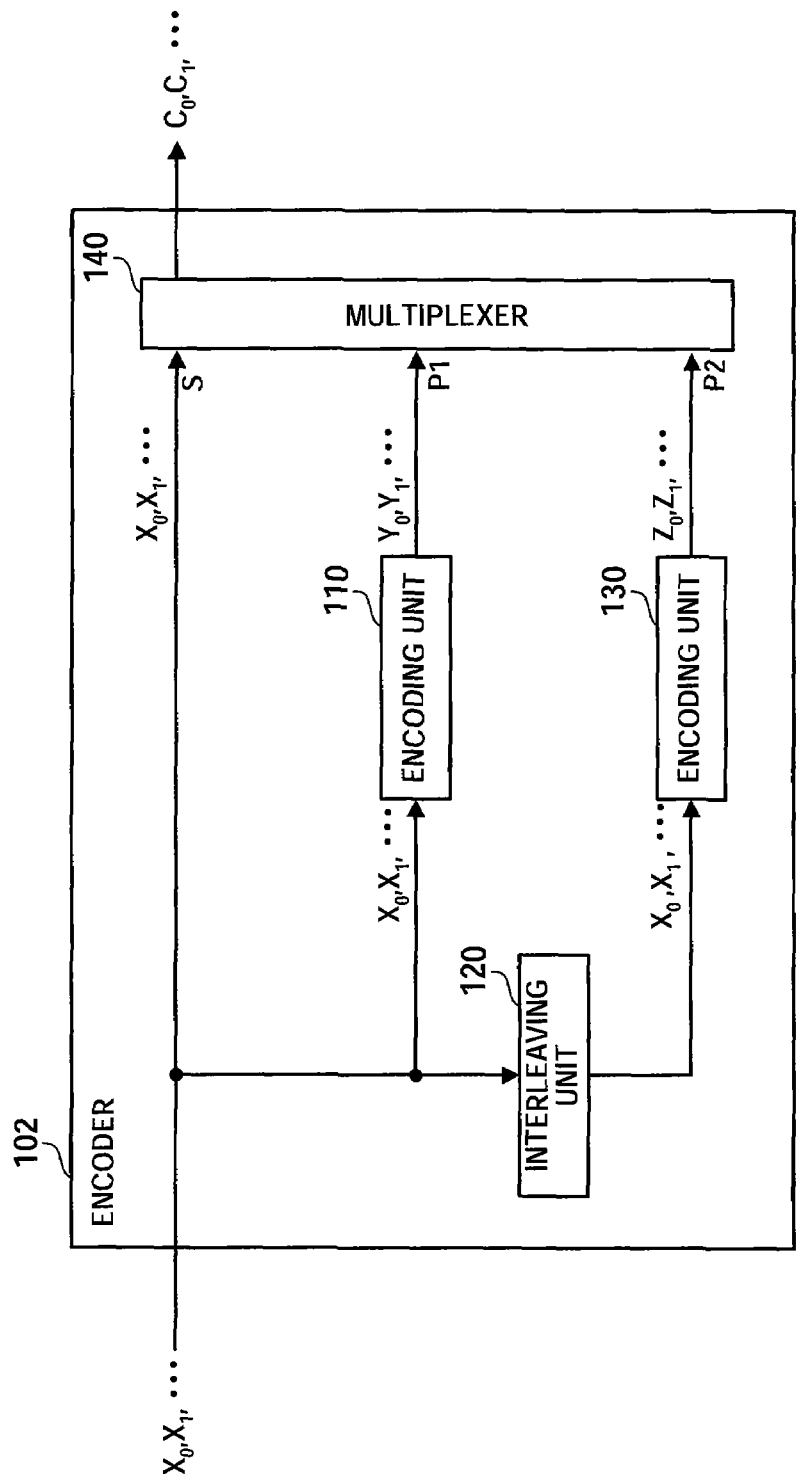
FIG. 4 is a block diagram illustrating the construction of an encoder according to the first embodiment.

FIG. 4 is a block diagram illustrating the construction of the encoder 102. The encoder 102 is a turbo convolutional encoder which encodes each of FEC blocks constituting transmission data into an error-correcting code, and outputs a series of encoded blocks $C=\{C_0, C_1, \ldots\}$. The series of encoded blocks $C=\{C_0, C_1, \ldots\}$ contains the series S of the FEC blocks $X=\{X_0, X_1, \ldots\}$ inputted into the encoder 102, the series of the parity data P1 (which is obtained by the convolutional encoding of each of the inputted FEC block), and the series of the parity data P2 (which is obtained by the interleaving and the convolutional encoding of each of the inputted FEC block).

The encoder 102 comprises encoding units 110 and 130, an interleaving unit 120, and a multiplexer 140. The encoding unit 110 encodes the series X of FEC blocks so as to generate a series Y of element-encoded blocks $Y_0, Y_1, \ldots$ respectively corresponding to the FEC blocks in the series X, and outputs the series Y to the multiplexer 140. The output of the encoding unit 110 is the series of the parity data P1.

The interleaving unit 120 performs interleaving of each FEC block in the inputted series X by changing the order of the bits constituting each FEC block in the inputted series X in accordance with a predetermined rule. For example, the interleaving unit 120 can performs the interleaving by temporarily storing each of the inputted FEC blocks in a memory (not shown), and reading out the bits constituting the FEC block in a predetermined order. The series of the interleaved FEC blocks are represented as $X'=\{X_0', X_1', \ldots\}$. The interleaving unit 120 outputs the series X' of the interleaved FEC blocks to the encoding unit 130.

The encoding unit 130 receives the series X' of the interleaved FEC blocks from the interleaving unit 120, encodes each of the interleaved FEC blocks in the series X', and outputs a series of element-encoded blocks (interleaved and encoded FEC blocks) $Z=\{Z_0, Z_1, \ldots\}$. That is, the data block $Z_0$ is the encoded result of the interleaved data block $X_0'$, and the data block $Z_1$ is the encoded result of the interleaved data block $X_1$. The output of the encoder encoding unit 130 is the series of the aforementioned parity data P2.

The multiplexer 140 receives and multiplexes the series S (of the FEC blocks inputted into the encoder 102), the outputs P1 (from the encoding unit 110), and the output P2 (from the encoding unit 130), and generates the encoded blocks $C=\{C_0, C_1, \ldots\}$, where $C_0=\{X_0, Y_0, Z_0\}$, $C_1=\{X_1, Y_1, Z_1\}, \ldots$. In order to adjust the timings of the data S, P1, and P2, the multiplexer 140 comprises buffer memories which appropriately delay the data S, P1, and P2. The multiplexer 140 outputs the encoded blocks C to the interleaver 103. For example, the data blocks $X_0, Y_0, Z_0$ are serially outputted as the turbo code $C_0$.

First Example of Encoding Unit

Figure 5:
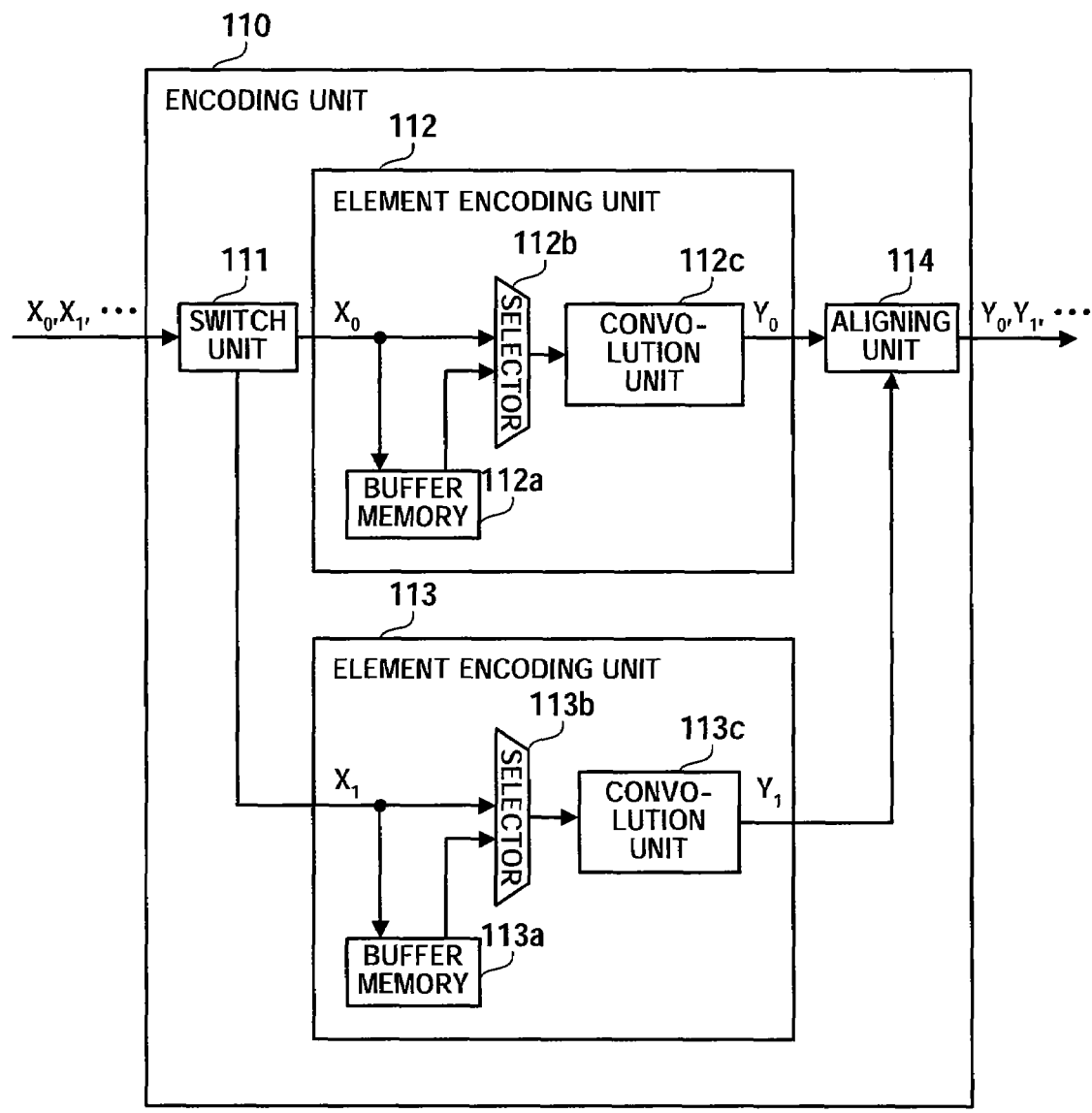
FIG. 5 is a block diagram illustrating the construction of a first example of an encoding unit according to the first embodiment.

FIG. 5 is a block diagram illustrating the construction of a first example of the encoding unit 110. The encoding unit 110 comprises a switch unit 111, element encoding units 112 and 113, and an aligning unit 114. The switch unit 111 switches the destination of the output for each FEC block. For example, the switch unit 111 receives the series X of FEC blocks, and alternately outputs the even-numbered FEC blocks (e.g., the FEC block $X_0$) to the element encoding unit 112, and the odd-numbered FEC blocks (e.g., the FEC block $X_1$) to the element encoding unit 113.

The element encoding units 112 and 113 receive the FEC blocks from the switch unit 111, perform convolutional encoding of the received FEC blocks, and outputs the element-encoded blocks. Specifically, the element encoding unit 112 receives the even-numbered FEC blocks $X_0, X_2, \ldots$ from the switch unit 111, generates the element-encoded blocks $Y_0, Y_2, \ldots$ respectively corresponding to the even-numbered FEC blocks $X_0, X_2, \ldots$, and outputs the element-encoded blocks $Y_1, Y_3, \ldots$ to the aligning unit 114. The element encoding unit 113 receives the odd-numbered FEC blocks $X_1, X_3, \ldots$ from the switch unit 111, generates the element-encoded blocks $Y_1, Y_3, \ldots$ respectively corresponding to the odd-numbered FEC blocks $X_1, X_3, \ldots$, and outputs the element-encoded blocks $Y_1, Y_3, \ldots$ to the aligning unit 114.

The element encoding units 112 and 113 use the tail-biting technique in the convolutional encoding. According to the tail-biting technique, the initial state is equalized with the final state in the transition sequence of the internal state of (i.e., the values of registers in) the convolution unit (explained later), so that the Viterbi decoding performed on the receiver side becomes efficient.

In the case where the initial state is equalized with the final state in the transition sequence of the state of the convolution unit (corresponding to the stages of the registers), the initial state is called the circulation state. The circulation state of the convolution unit can be expressed by an initial-state value $S_c$. That is, the initial-state value $S_c$ indicates the circulation state of the convolution unit (corresponding to the initial states of the registers in a main encoding step). The initial-state value $S_c$ can be obtained for each FEC block.

In order to obtain the initial-state value $S_c$ (indicating the initial state of the convolution unit in the main encoding step) for each FEC block, the element encoding units 112 or 113 performs preliminary encoding of the FEC block and obtains the final states of the registers in the convolution unit in an initialization step preceding the main encoding step. Then, the element encoding units 112 or 113 determines the initial-state value $S_c$ by performing a predetermined calculation based on the obtained final states. Thereafter, in the main encoding step, the element encoding units 112 or 113 performs the encoding of the same FEC block again by using the initial states of the registers based on the determined initial-state value $S_c$. That is, the processing for encoding of each FEC block includes at least two encoding steps of: (1) the initialization (preprocessing) step for obtaining the initial-state value $S_c$; and (2) the main encoding step performed on the basis of the initial-state value $S_c$, which is determined in the initialization step. The element-encoded block generated in the initialization step is discarded.

The element encoding units 112 and 113 are arranged in parallel in the stage following the switch unit 111 in the encoding unit 110. The element encoding unit 112 comprises a buffer memory 112a, a selector 112b, and a convolution unit 112c.

The buffer memory 112a stores each FEC block inputted into the encoding unit 110. The selector 112b selects one of the output from the switch unit 111 and the buffer memory 112a, and outputs the selected one to the convolution unit 112c. In the initialization (preprocessing) step executed by the convolution unit 112c, the selector 112b outputs to the convolution unit 112c an FEC block outputted from the switch unit 111. In the main encoding step executed by the convolution unit 112c on the basis of the initial state determined in the initialization step, the selector 112b outputs to the convolution unit 112c an FEC block outputted from the buffer memory 112a.

The convolution unit 112c is a convolutional encoder which performs convolutional encoding of the FEC block inputted into the convolution unit 112c. Specifically, first, in the initialization step, the convolution unit 112c obtains the initial-state value $S_c$ (indicating the initial states of the registers used in the convolutional encoding in the initialization step) by using an FEC block (e.g., the FEC block $X_0$). Thereafter, in the main encoding step, the convolution unit 112c receives the same FEC block again, performs convolutional encoding of the FEC block by using the initial-state value $S_c$, and generates an element-encoded block (e.g., the element-encoded block $Y_0$). Then, the convolution unit 112c outputs the generated, element-encoded block to the aligning unit 114.

The element encoding unit 113 comprises a buffer memory 113a, a selector 113b, and a convolution unit 113c. The constituent elements of the element encoding unit 113 have the same functions as the constituent elements of the element encoding unit 112 having the same names. The aligning unit 114 arranges the even-numbered, element-encoded blocks $Y_0, Y_2, \ldots$ and the odd-numbered, element-encoded blocks $Y_1, Y_3, \ldots$, and outputs the element-encoded blocks in the order of the series $Y=\{Y_0, Y_1, \ldots\}$. The output of the aligning unit 114 is the output P1 of the encoding unit 110.

Further, the encoding unit 130 can also be realized with a similar construction to the encoding unit 110.

Figure 6:
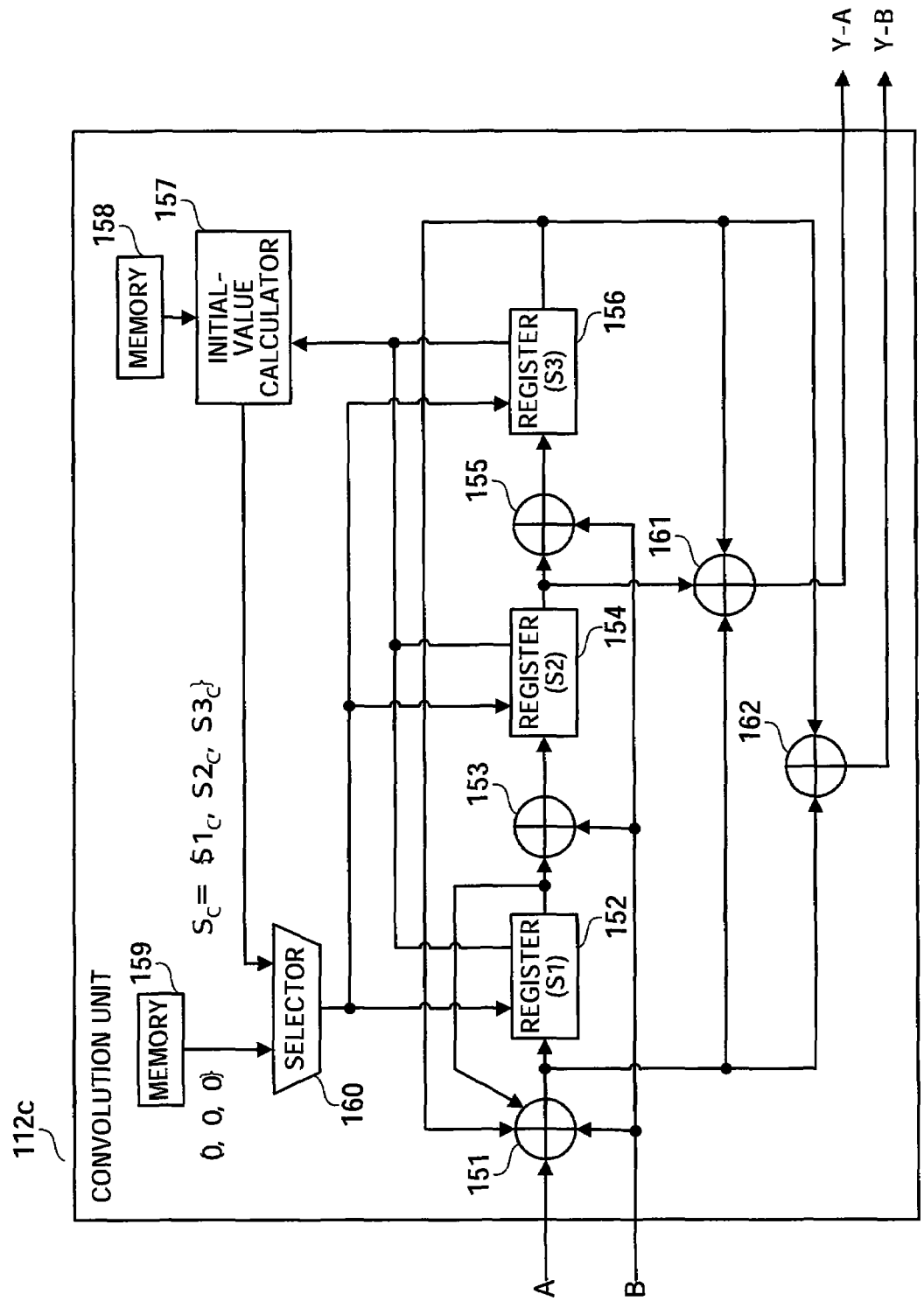
FIG. 6 illustrates the construction of an example of a convolution unit in the first example of the encoding unit.

FIG. 6 illustrates the construction of an example of the convolution unit 112c in the first example of the encoding unit 110. The convolution unit 112c executes the initialization step and the main encoding step in a time shared manner.

The bits constituting each FEC block are successively inputted into the convolution unit 112c in units of 2 bits. Specifically, in each cycle of operation of the convolution unit 112c, a pair of bits from the FEC block are concurrently inputted through two input ports A and B, and the convolution unit 112c outputs two encoded bits Y-A and Y-B in response to the pair of inputted bits. That is, the convolution unit 112c is a double-binary convolutional encoder which receives a pair of bits and outputs a pair of encoded bits in each cycle of operation. For example, a series of bits "101101 . . . " contained in the data block $X_0$ are successively inputted in pairs of bits as (1, 0), (1, 1), (0, 1), . . . from the leading bit of the series, and pairs of encoded bits corresponding to the pairs of inputted bits are successively outputted from the convolution unit 112c.

The number of cycles of operation to be executed for encoding one FEC block of the double-binary encoder is half of the bit length of the FEC block. For example, in the case where the size of each FEC block is 480 bits, the number of cycles executed for encoding one FEC block is 240 (=480/2). However, since the initialization step and the main encoding step are executed in the convolution unit 112c, 240 cycles of operation are executed in each of the initialization step and the main encoding step (i.e., 480 cycles of operation are executed for each FEC block).

The convolution unit 112c comprises adders 151, 153, 155, 161, and 162, registers 152, 154, and 156, an initial-value calculator 157, memories 158 and 159, and a selector 160. The adder 151 calculates an exclusive OR of the inputs from the input ports A and B and the outputs of the registers 152 and 156, and outputs the calculation result to the register 152 and the adders 161 and 162. The register 152 plays the role of a delay circuit which delays one-bit information S1 (inputted from the adder 151) by temporarily holding the one-bit information S1. The register 152 feeds back the one-bit information S1 (temporarily held in the register 152) to the adder 151, and outputs the one-bit information S1 to the adder 153.

The adder 153 calculates an exclusive OR of the input from the input port B and the output of the register 152, and outputs the calculation result to the register 154. The register 154 plays the role of a delay circuit which delays one-bit information S2 (inputted from the adder 153) by temporarily holding the one-bit information S2. The register 154 outputs to the adders 155 and 161 the one-bit information S2 (temporarily held in the register 154).

The adder 155 calculates an exclusive OR of the input from the input port B and the output of the register 154, and outputs the calculation result to the register 156. The register 156 plays the role of a delay circuit which delays one-bit information S3 (inputted from the adder 155) by temporarily holding the one-bit information S3. The register 156 feeds back the one-bit information S3 (temporarily held in the register 156) to the adder 151, and outputs the one-bit information S3 to the adders 161 and 161.

The initial-value calculator 157 and the selector 160 are connected to the registers 152, 154, and 156. The registers 152, 154, and 156 output to the initial-value calculator 157 the values held in the registers 152, 154, and 156 in the final state in the initialization step. Further, before the start of each of the initialization step and the main encoding step, the registers 152, 154, and 156 receive and hold initial values for use in execution of each of the initialization step and the main encoding step.

When the initial-value calculator 157 receives the values held in the registers 152, 154, and 156 in the final state in the initialization step, the initial-value calculator 157 performs a predetermined calculation, and determines the initial-state value $S_c$ on the basis of the calculation result and a predetermined table stored in the memory 158. The initial-value calculator 157 outputs to the selector 160 the initial value $S1_c$ of the register 152, the initial value $S2_c$ of the register 154, and the initial value $S3_c$ of the register 156 which correspond to the above initial-state value $S_c$.

The memory 158 stores an initial-value table, which indicates the correspondence between the initial-state values $S_c$ and a final-state values $S0_{N-1}$, where $S0_{N-1}=(S1_{N-1}, S2_{N-1}, S3_{N-1})$, i.e., $S0_{N-1}=2^2 \times S1_{N-1}+2 \times S2_{N-1}+S3_{N-1}$. The values $S1_{N-1}, S2_{N-1}$, and $S3_{N-1}$ are respectively the values of the registers 152, 154, and 156 in the final state in the initialization step, and the subscript "N−1" indicates the final cycle among the N cycles of operation executed in the initialization step for each FEC block. The memory 159 stores the initial values (0, 0, 0) of the registers 152, 154, and 156 when the initialization step is started.

The selector 160 selects the initial values to be inputted into the registers 152, 154, and 156, when each of the initialization step and the main encoding step is started. When the initialization step is started, the selector 160 selects as the initial values of the registers 152, 154, and 156 the values (0, 0, 0) stored in the memory 159. When the main encoding step is started, the selector 160 selects as the initial values of the registers 152, 154, and 156 the initial values $S1_c$, $S2_c$, and $S3_c$ determined by the initial-value calculator 157.

The adder 161 calculates an exclusive OR of the outputs of the adder 151 and the registers 154 and 156, generates the encoded bit Y-A, and outputs the encoded bit Y-A to the aligning unit 114. The adder 162 calculates an exclusive OR of the outputs of the adder 151 and the register 156, generates the encoded bit Y-B, and outputs the encoded bit Y-B to the aligning unit 114.

Further, the other convolution units in the element encoding unit 113 and the other encoding unit 130 can also be realized with similar constructions to the convolution unit 112c.

As explained above, in the first example of the encoding unit 110, each convolution unit executes both of the initialization step and the main encoding step. This arrangement in the first example of the encoding unit 110 realizes the minimum circuit construction of the element encoding unit 112.

Since the encoding unit 130 also generates encoded bits in a similar manner to the encoding unit 110, the coding rate of the turbo code generated by the encoder 102 is ⅓. However, in the case where only one encoded bit can realize sufficient error-correcting capability in decoding, it is possible to omit generation of one of the encoded bits Y-A and Y-B in order to reduce the amount of data which are transmitted and/or calculated. In this case, one encoded bit is generated in response to two input bits, so that the coding rate is ½.

FIG. 7 illustrates the data structure of an example of the initial-value table. The initial-value table 158a indicates the correspondence between the initial-state value $S_c$ and the final-state value $S0_{N-1}$ for each value of the number N (represented by N_mod 7) of cycles of operation executed by the convolution unit in the main encoding step. As mentioned before, the initial-state value $S_c$ indicates the circulation state of the convolution unit, and $S0_{N-1}=(S1_{N-1}, S2_{N-1}, S3_{N-1})$, i.e., $S0_{N-1}=2^2 \times S1_{N-1}+2 \times S2_{N-1}+S3_{N-1}$, where $S1_{N-1}, S2_{N-1}$, and $S3_{N-1}$ are respectively the values of the registers 152, 154, and 156 in the final state in the initialization step. Therefore, $S0_{N-1}$ can have one of the values 0, 1, . . . 7. In addition, as mentioned before, the initial-value table 158a is stored in the memory 158 in the convolution unit 112c. For example, according to the initial-value table 158a, in the case where the number N_mod 7 of cycles of operation executed by the convolution unit in the main encoding step is "1," the initial-state value $S_c$ is "0" when $S0_{N-1}=0$, "6" when $S0_{N-1}=1$, "4" when $S0_{N-1}=2$, "2" when $S0_{N-1}=3$, "7" when $S0_{N-1}=4$, "1" when $S0_{N-1}=5$, "3" when $S0_{N-1}=6$, and "5" when $S0_{N-1}=7$. Therefore, when $S0_{N-1}=3$, $S_c=2$, i.e., $(S1_c, S2_c, S3_c)=(0, 1, 0)$. Further, in the case where the number N_mod 7 of cycles of operation executed by the convolution unit in the main encoding step is "3," and $S0_{N-1}=1$, $S_c=5$, i.e., $(S1_c, S2_c, S3_c)=(1, 0, 1)$. As mentioned before, the operations for obtaining the initial-state value $S_c$ are performed by the initial-value calculator 157.

Hereinbelow, the processing for encoding performed by the encoding unit 110 arranged as above are explained.

Figure 8:
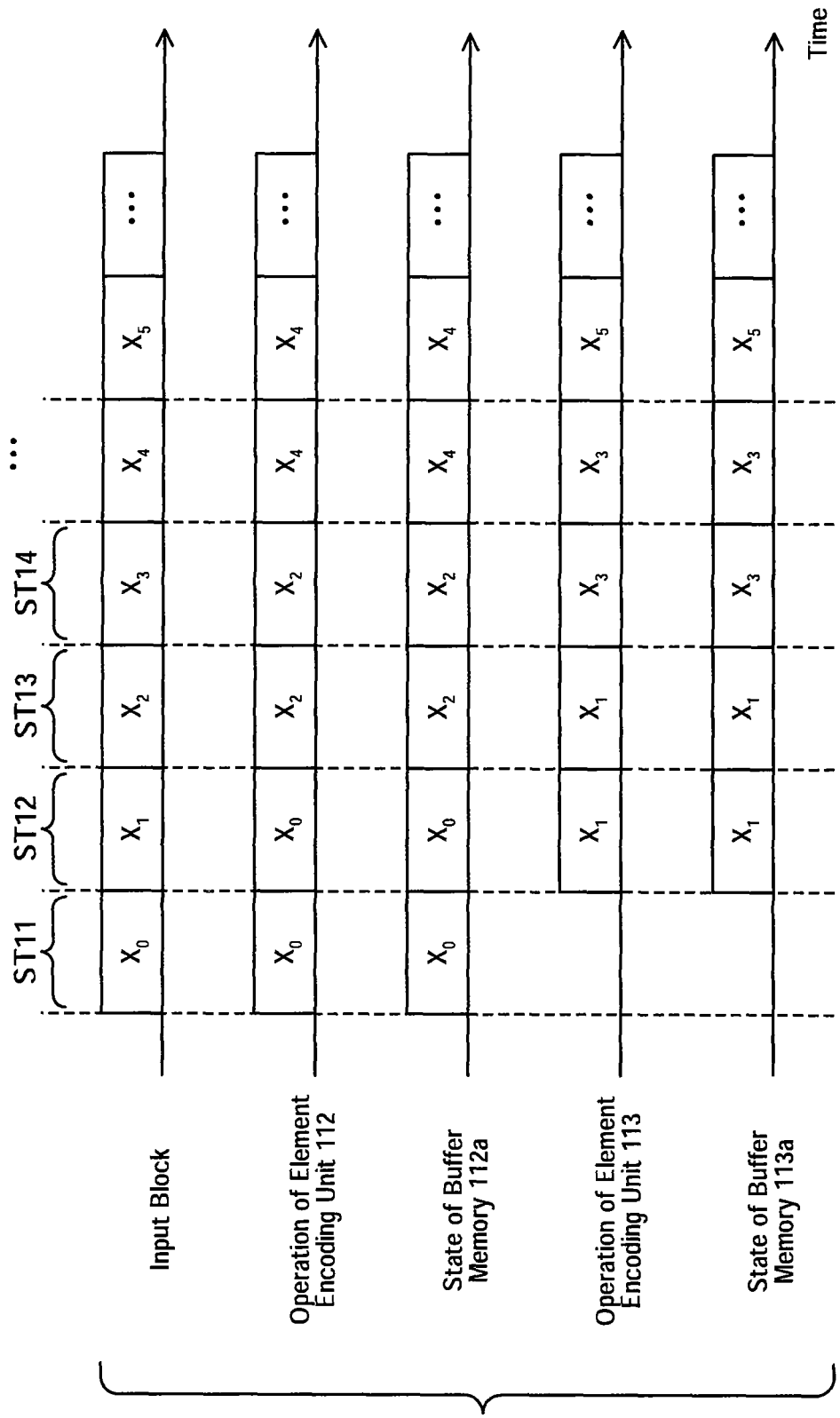
FIG. 8 is a timing diagram indicating the timings of operations for encoding performed by the encoding unit according to the first embodiment.

FIG. 8 is a timing diagram indicating the timings of operations for encoding performed by the encoding unit 110 according to the first embodiment. The operations for encoding is explained with reference to FIG. 8 step by step. In the following explanations, the initial-state values for encoding FEC blocks $X_0, X_1, \ldots$ are respectively represented by $S_{c0}, S_{c1}, \ldots$.

<Step ST11> The switch unit 111 outputs the FEC block $X_0$ to the element encoding unit 112. The element encoding unit 112 obtains the initial-state value $S_{c0}$ from the inputted FEC block $X_0$. In addition, the FEC block $X_0$ is held in the buffer memory 112a.

<Step ST12> The switch unit 111 outputs the FEC block $X_1$ to the element encoding unit 113. The element encoding unit 112 acquires the FEC block $X_0$ from the buffer memory 112a and performs encoding of the acquired FEC block $X_0$ by using the initial-state value $S_{c0}$ obtained in step ST11, and generates an element-encoded block $Y_0$. The element encoding unit 113 obtains the initial-state value $S_{c1}$ from the inputted FEC block $X_1$. In addition, the FEC block $X_1$ is held in the buffer memory 113a.

<Step ST13> The switch unit 111 outputs the FEC block $X_2$ to the element encoding unit 112. The element encoding unit 112 obtains the initial-state value $S_{c2}$ from the inputted FEC block $X_2$. In addition, the FEC block $X_0$ is removed from the buffer memory 112a, and the newly inputted FEC block $X_2$ is held in the buffer memory 112a. Further, the element encoding unit 113 acquires the FEC block $X_1$ from the buffer memory 113a and performs encoding of the acquired FEC block $X_1$ by using the initial-state value $S_{c1}$ obtained in step ST12, and generates an element-encoded block $Y_1$.

<Step ST14> The switch unit 111 outputs the FEC block $X_3$ to the element encoding unit 113. The element encoding unit 112 acquires the FEC block $X_2$ from the buffer memory 112a and performs encoding of the acquired FEC block $X_2$ by using the initial-state value $S_{c2}$ obtained in step ST13, and generates an element-encoded block $Y_2$. The element encoding unit 113 obtains the initial-state value $S_{c3}$ from the inputted FEC block $X_3$. In addition, the FEC block $X_1$ is removed from the buffer memory 113a, and the newly inputted FEC block $X_3$ is held in the buffer memory 113a.

Thereafter, similar operations are performed until encoding of all the FEC blocks in the series X is completed.

Since the element encoding units 112 and 113 are alternately used for encoding of the successively inputted FEC blocks as described above, the delay time due to the encoding can be equalized with twice the processing time of an FEC block. That is, the delay time becomes the time of the minimum processing including the initialization step and the main encoding step.

In order to clarify the advantage of the above alternative use of the element encoding units 112 and 113, an imaginary encoding unit in which only one element encoding unit (e.g., the element encoding unit 112) is arranged is considered below for comparison.

Figure 9:
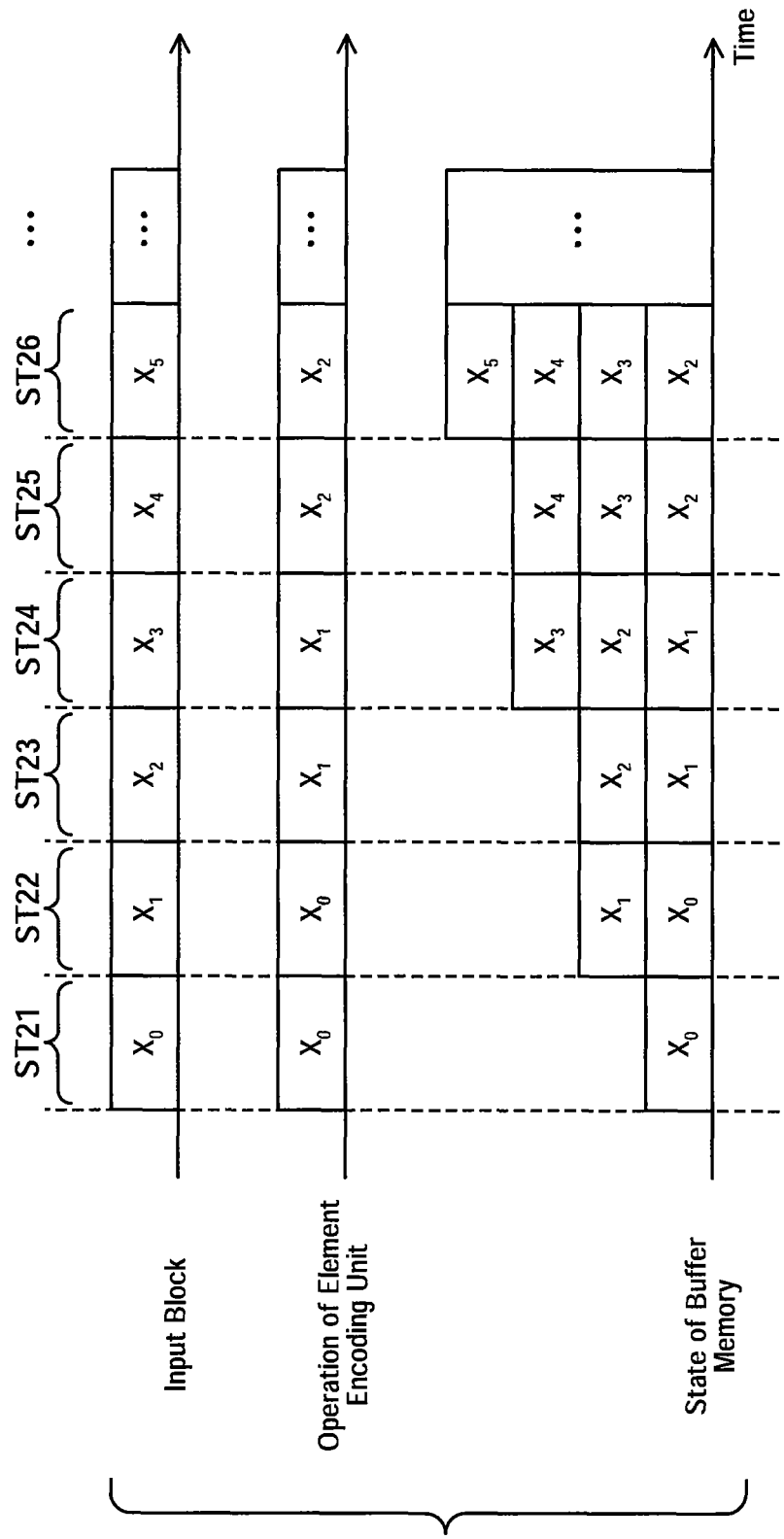
FIG. 9 is a timing diagram indicating the timings of operations for encoding performed by an imaginary encoding unit having only one element encoding unit.

FIG. 9 is a timing diagram indicating the timings of operations for encoding performed by an imaginary encoding unit having only one element encoding unit. The operations of such an encoding unit are explained with reference to FIG. 9 step by step. Since the construction of the imaginary encoding unit per se is not indicated by a drawing, the imaginary encoding unit is assumed to have only one element encoding unit which is similar to the element encoding unit 112 illustrated in FIG. 5. (The reference numbers are not indicated in the following explanation.)

<Step ST21> The FEC block $X_0$ is inputted into the encoding unit. The element encoding unit obtains the initial-state value $S_{c0}$ from the inputted FEC block $X_0$. In addition, the FEC block $X_0$ is held in the buffer memory.

<Step ST22> The FEC block $X_1$ is inputted into the encoding unit. The element encoding unit acquires the FEC block $X_0$ from the buffer memory and performs encoding of the acquired FEC block $X_0$ by using the initial-state value $S_{c0}$ obtained in step ST21, and generates an element-encoded block $Y_0$. In addition, the FEC block $X_1$ is newly held in the buffer memory.

<Step ST23> The FEC block $X_2$ is inputted into the encoding unit. The element encoding unit acquires the FEC block $X_1$ from the buffer memory and obtains the initial-state value $S_{c1}$ from the inputted FEC block $X_1$. In addition, the FEC block $X_0$ is removed from the buffer memory, and the newly inputted FEC block $X_2$, as well as the FEC block $X_1$, is held in the buffer memory.

<Step ST24> The FEC block $X_3$ is inputted into the encoding unit. The element encoding unit acquires the FEC block $X_1$ from the buffer memory and performs encoding of the acquired FEC block $X_1$ by using the initial-state value $S_{c1}$ obtained in step ST23, and generates an element-encoded block $Y_1$. In addition, the FEC block $X_3$ is newly held in the buffer memory.

<Step ST25> The FEC block $X_4$ is inputted into the encoding unit. The element encoding unit acquires the FEC block $X_2$ from the buffer memory and obtains the initial-state value $S_{c2}$ from the inputted FEC block $X_2$. In addition, the FEC block $X_1$ is removed from the buffer memory, and the newly inputted FEC block $X_4$, as well as the FEC blocks $X_2$ and $X_3$, is held in the buffer memory.

<Step ST26> The FEC block $X_5$ is inputted into the encoding unit. The element encoding unit acquires the FEC block $X_2$ from the buffer memory and performs encoding of the acquired FEC block $X_2$ by using the initial-state value $S_{c2}$ obtained in step ST25, and generates an element-encoded block $Y_2$. In addition, the FEC block $X_5$ is newly held in the buffer memory.

Thereafter, similar operations are performed until encoding of all the FEC blocks in the series X is completed.

As described above, in the case where the encoding unit has only one convolution unit, the encoding processing cannot catch up with the input rate of the FEC blocks, so that the processing delay increases with the lapse of time. In addition, when the number of the FEC blocks increases, the amount of data required to be buffered also increases, so that the size of the circuitry including the buffer memory increases.

On the other hand, the element encoding units 112 and 113 are arranged in the encoding unit 110, and the use is switched between the element encoding units 112 and 113 every time an FEC block is newly inputted into the encoding unit 110. Therefore, as explained before with reference to FIG. 8, each of the buffer memories 112a and 113a is required to hold only one FEC block at all times. That is, the amount of data to be held can be minimized, so that it is possible to realize the element encoding units 112 and 113 with the minimized circuitry.

Second Example of Encoding Unit

Figure 10:
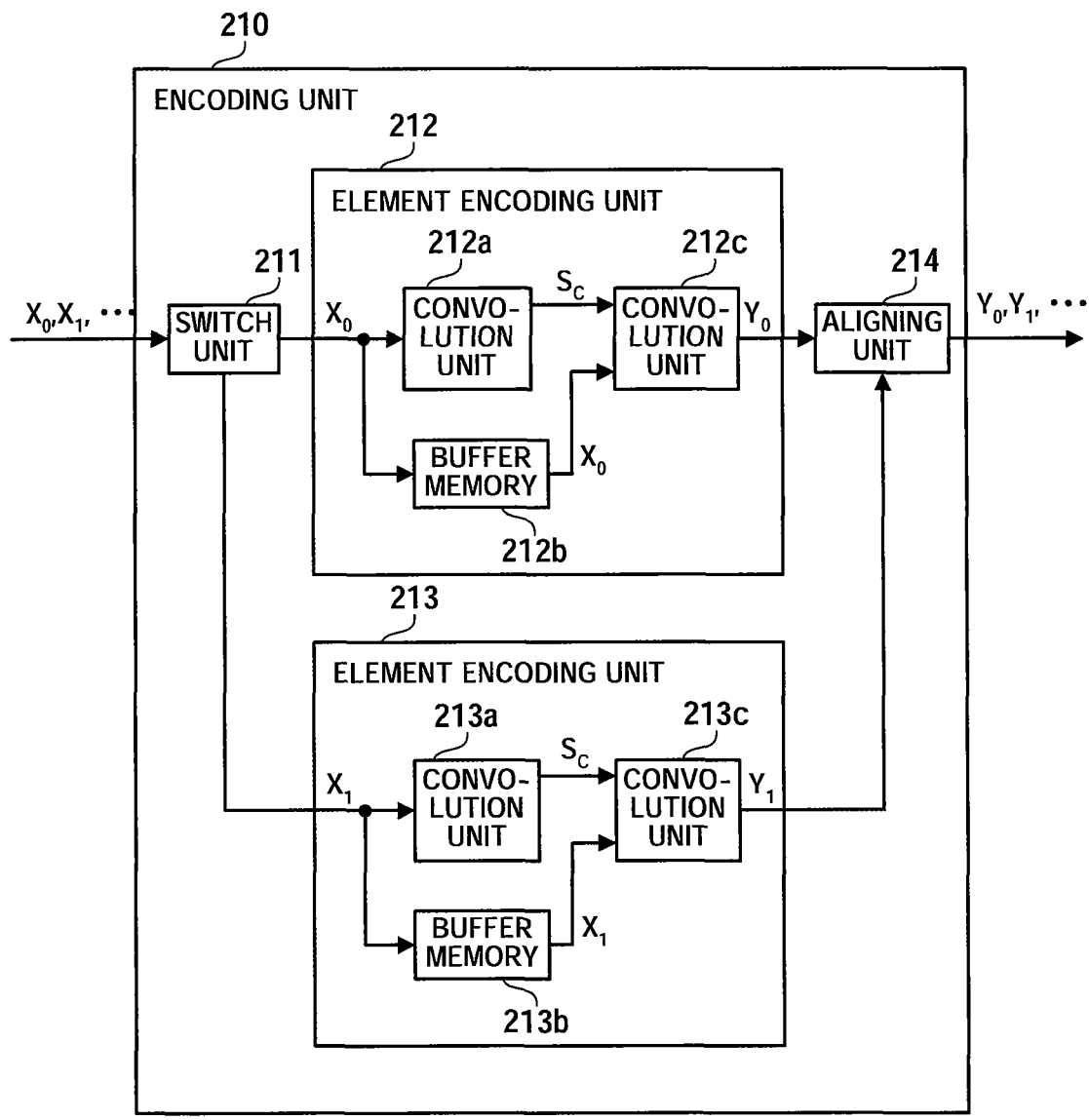
FIG. 10 is a block diagram illustrating the construction of a second example of an encoding unit according to the first embodiment.

FIG. 10 is a block diagram illustrating the construction of the second example 210 of the encoding unit according to the first embodiment. The encoding unit 210 of FIG. 10 can replace the encoding unit 110 in the encoder 102. The encoding unit 210 comprises a switch unit 211, element encoding units 212 and 213, and an aligning unit 214. The switch unit 211 and the aligning unit 214 are respectively similar to the switch unit 111 and aligning unit 114 illustrated in FIG. 4.

The element encoding units 212 and 213 are arranged in parallel in the stage following the switch unit 211, and the aligning unit 214 arranges the outputs of the element encoding units 212 and 213. The element encoding unit 212 comprises a first convolution unit 212a, a buffer memory 212b, and a second convolution unit 212c.

The first convolution unit 212a obtains the initial-state value $S_c$ by using each FEC block (e.g., the FEC block $X_0$), which is inputted into the encoding unit 210. Then, the first convolution unit 212a outputs the obtained initial-state value $S_c$ to the second convolution unit 212c. The buffer memory 212b stores the FEC block. The second convolution unit 212c acquires the initial-state value $S_c$ from the first convolution unit 212a, and the FEC block from the buffer memory 212b, performs convolutional encoding of the FEC block by using the initial-state value $S_c$, and generates an element-encoded block (e.g., the element-encoded block $Y_0$). Then, the convolution unit 212c outputs the generated, element-encoded block to the aligning unit 214.

The element encoding unit 213 comprises a first convolution unit 213a, a buffer memory 213b, and a second convolution unit 213c. The constituent elements of the element encoding unit 213 have the same functions as the constituent elements of the element encoding unit 212 having the same names.

Figure 11:
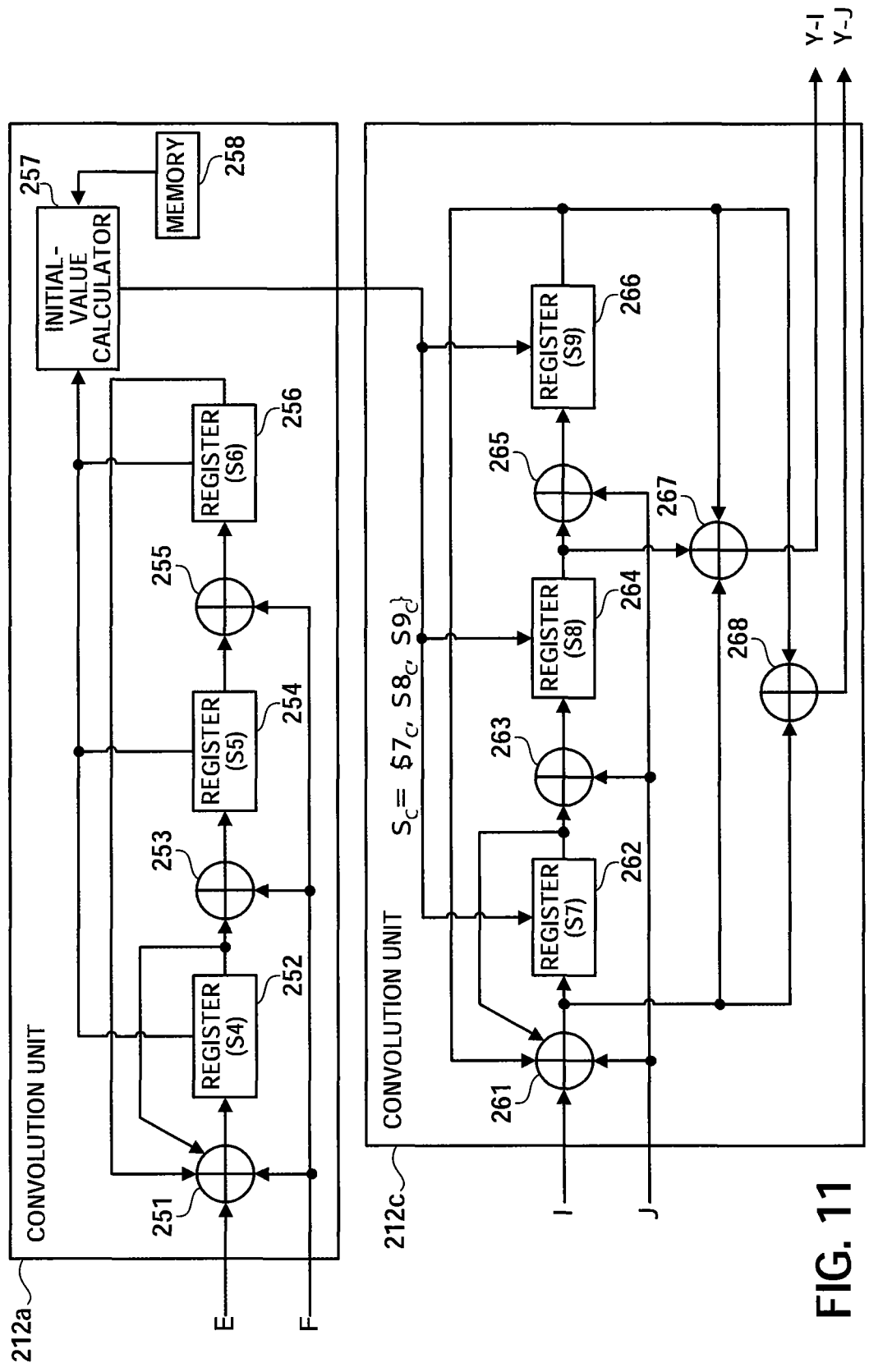
FIG. 11 illustrates the constructions of examples of first and second convolution units in the second example of the element encoding unit.

FIG. 11 illustrates the constructions of examples of the first and second convolution units 212a and 212c in the element encoding unit 210 as the second example. The first convolution unit 212a is used in the initialization step, and the second convolution unit 212c is used in the main encoding step.

The bits constituting each FEC block are successively inputted into the convolution unit 212a in units of 2 bits. Specifically, in each cycle of operation of the convolution unit 212a, a pair of bits from the FEC block are concurrently inputted through two input ports E and F. Similar to the first example illustrated in FIGS. 5 and 6, the number of cycles of operation to be executed for obtaining the initial-state value $S_c$ is half of the bit length of the FEC block. For example, in the case where the size of each FEC block is 480 bits, the number of cycles executed for obtaining the initial-state value $S_c$ is 240 (=480/2).

The first convolution unit 212a comprises adders 251, 253, and 255, registers 252, 254, and 256, an initial-value calculator 257, and a memory 258. The adders 251, 253, and 255, the registers 252, 254, and 256, the initial-value calculator 257, and the memory 258 respectively correspond to and have similar functions to the adders 151, 153, and 155, the registers 152, 154, and 156, the initial-value calculator 157, and the memory 158, which are illustrated in FIG. 6.

The bit values held in the registers 252, 254, and 256 are respectively indicated by S4, S5, and S6. The initial values of S4, S5, and S6 initially inputted into the registers 252, 254, and 256 are all zero. In addition, the initial-value calculator 257 determines the initial-state value $S_c$, and outputs initial values corresponding to the initial-state value $S_c$ to the registers 262, 264, and 266 as explained later.

The second convolution unit 212c acquires an FEC block from the buffer memory 212b and the initial-state value $S_c$ from the initial-value calculator 257, and performs convolutional encoding of the FEC block by using the initial-state value $S_c$. The bits constituting each FEC block are successively inputted into the convolution unit 212c in units of 2 bits. Specifically, in each cycle of operation of the convolution unit 112c, a pair of bits from the FEC block are concurrently inputted through two input ports I and J, and the convolution unit 112c outputs two encoded bits Y-I and Y-J in response to the pair of inputted bits. The number of cycles of operation to be executed for encoding one FEC block in the double-binary encoder is half of the bit length of the FEC block. For example, in the case where the size of each FEC block is 480 bits, the number of cycles executed for encoding one FEC block is 240.

The convolution unit 212c comprises adders 261, 263, 265, 267, and 268 and registers 262, 264, and 266. The adders 261, 263, 265, 267, and 268 and the registers 262, 264, and 266 respectively correspond to and have similar functions to the adders 151, 153, 155, 161, and 162 and the registers 152, 154, and 156, which are illustrated in FIG. 6.

The bit values held in the registers 262, 264, and 266 are respectively indicated by S7, S8, and S9. The initial values of S7, S8, and S9 initially inputted into the registers 262, 264, and 266 are all zero. In addition, the initial-value calculator 257 determines the initial-state value $S_c$ (=($S7_c$, $S8_c$, $S9_c$)) constituted by the initial values $S7_c$, $S8_c$, $S9_c$ for the registers 252, 254, and 256, and outputs the initial values $S7_c$, $S8_c$, $S9_c$ to the registers 252, 254, and 256, respectively.

The first and second convolution units 213a and 213c in the element encoding unit 213 can also have similar constructions to the first and second convolution units 212a and 212c in the element encoding unit 212, respectively.

As explained above, in the encoding unit 210 as the second example, the initialization step and the main encoding step are executed by pipeline processing using the first and second convolution units. Therefore, the throughput of the second example of the encoding unit is twice the throughput of the first example. Thus, the encoding unit 210 as the second example can achieve an advantage similar to the advantage explained before with reference to FIGS. 8 and 9 even when the input rate of the FEC blocks is twice the input rate in the first example.

Second Embodiment

The second embodiment is explained in detail below. The following explanations on the second embodiment are focused on only the differences from the first embodiment, and the explanations on the features of the second embodiment which are similar to the first embodiment are not repeated.

The wireless communication system according to the second embodiment can be realized by a configuration similar to the configuration of the first embodiment illustrated in FIG. 2.

Figure 12:
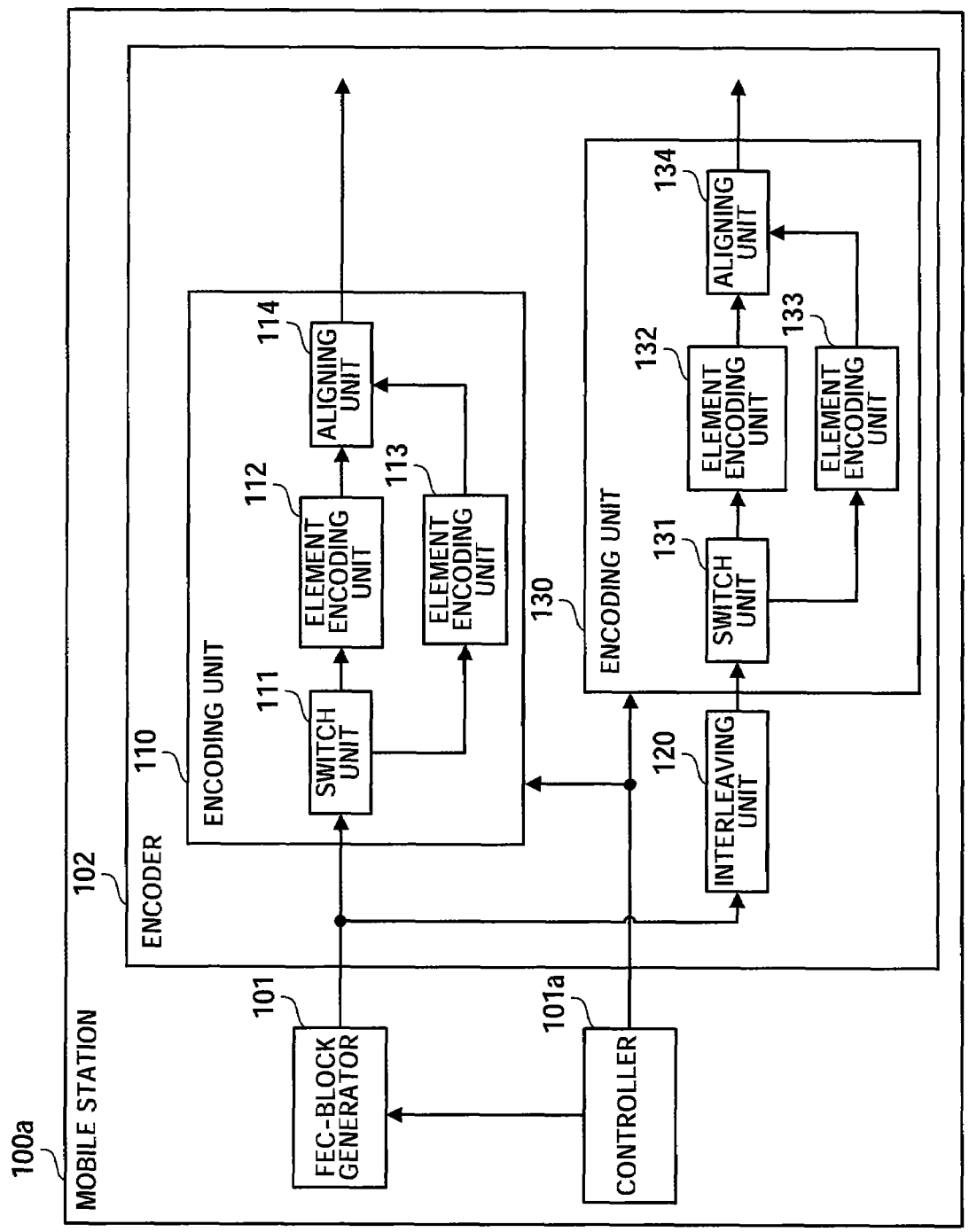
FIG. 12 is a block diagram illustrating the construction of a mobile station according to the second embodiment.

FIG. 12 is a block diagram illustrating the construction of a mobile station according to the second embodiment. The mobile station 100a of FIG. 12 comprises an FEC-block generator 101, a controller 101a, an encoder 102, an interleaver 103, a modulator 104, a transmitter/receiver 105, an antenna 106, a demodulator 107, a deinterleaver 108, and a decoder 109, although the interleaver 103, the modulator 104, the transmitter/receiver 105, the antenna 106, the demodulator 107, the deinterleaver 108, and the decoder 109 are not shown in FIG. 12. The mobile station 100a according to the second embodiment is different from the first embodiment in that the operations of the FEC-block generator 101 and/or the switch units 111 and 131 are controlled by the controller 101a, and the constituent elements of the mobile station 100a other than the FEC-block generator 101 and the controller 101a are respectively similar to the corresponding constituent elements of the mobile station 100 according to the first embodiment (illustrated in FIG. 3).

In addition, the encoder 102 in the mobile station 100a comprises an encoding unit 110, an interleaving unit 120, an encoding unit 130, and a multiplexer 140 (although illustration of the multiplexer 140 and the input S (i.e., the FEC blocks $X_0$, $X_1$, . . . ) into the multiplexer 140 are omitted in FIG. 12), and the constituent elements of the encoder 102 in the mobile station 100a are respectively similar to the corresponding constituent elements of the encoder 102 illustrated in FIG. 4. Further, the encoding unit 110 in the mobile station 100a comprises a switch unit 111, element encoding units 112 and 113, and an aligning unit 114, and the encoding unit 130 in the mobile station 100a comprises a switch unit 131, element encoding units 132 and 133, and an aligning unit 134. The constituent elements of the encoding unit 110 in the mobile station 100a are respectively similar to the corresponding constituent elements of the encoding unit 110 illustrated in FIG. 5, and the constituent elements of the encoding unit 130 in the mobile station 100a are respectively similar to the corresponding constituent elements of the encoding unit 110 illustrated in FIG. 5.

When data to be transmitted (transmission data) occurs, the controller 101a instructs the FEC-block generator 101 on the transmission rate of FEC blocks of the transmission data. The transmission rate determines the input rate of the FEC blocks (i.e., the amount of FEC blocks which are inputted into the encoder 102 per unit time). For example, the controller 101a sets a high transmission rate when the size of the transmission data is great, and a low transmission rate when the size of the transmission data is small. In the latter case, the controller 101a instructs the FEC-block generator 101 to intermittently output the FEC blocks. In addition, when the transmission rate is low, the controller 101a controls the switch units 111 and 131 so that the switch units 111 and 131 output the FEC blocks to only the element encoding units 112 and 132.

In the following explanations on the second embodiment, the element encoding units are assumed to have the structures in accordance with the aforementioned first example as illustrated in FIG. 5.

Figure 13:
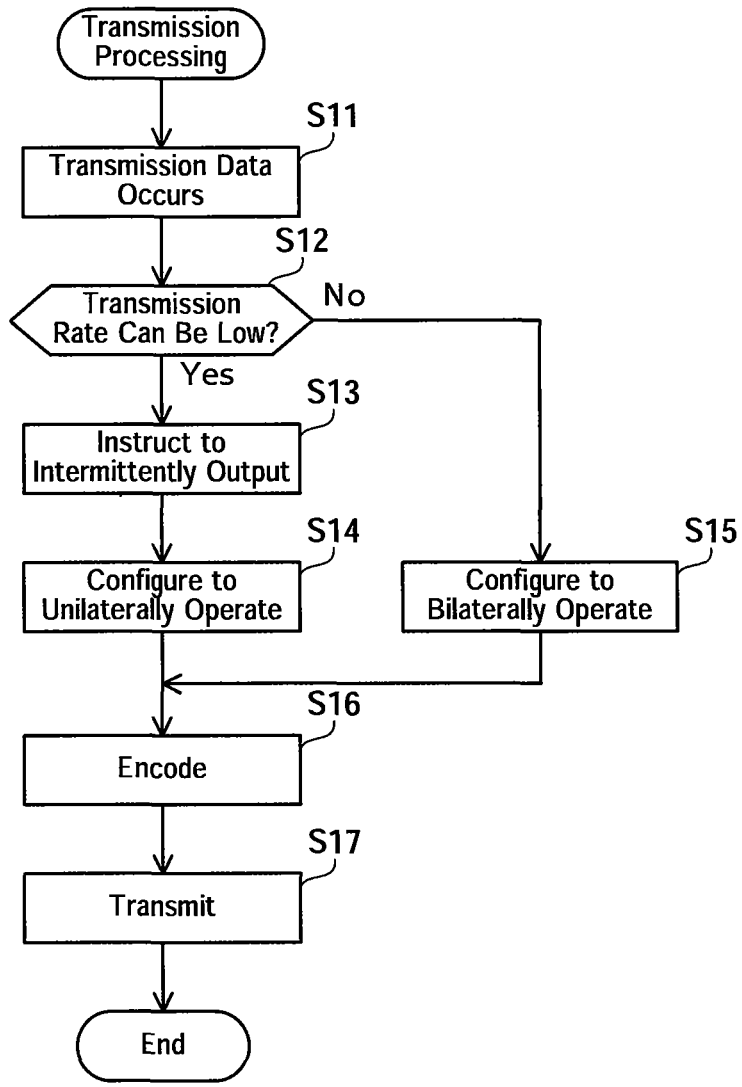
FIG. 13 is a flow diagram indicating a sequence of processing for transmission according to the second embodiment.

Next, processing for transmission of data from the mobile station 100a having the above construction is explained. FIG. 13 is a flow diagram indicating a sequence of processing for transmission according to the second embodiment. The processing of FIG. 13 is explained below step by step.

<Step S11> The controller 101a detects that transmission data to be transmitted to the wireless base station 20 occurs.

<Step S12> The controller 101a determines whether or not the transmission rate can be set at a low level. When yes is determined, the operation goes to step S13. When no is determined, the operation goes to step S15.

<Step S13> The controller 101a instructs the FEC-block generator 101 to intermittently output FEC blocks. In response to the instruction, the FEC-block generator 101 starts the intermittent output of FEC blocks, for example, in such a manner that the FEC-block generator 101 outputs an FEC block in a certain time interval, and stops the output of an FEC block in the following interval.

<Step S14> The controller 101a configures the encoding units 110 and 130 to unilaterally operate (i.e., to use only one element encoding unit in the convolutional encoding).

<Step S15> The controller 101a configures the encoding units 110 and 130 to bilaterally operate (i.e., to use both the element encoding units 112 and 113, or both the element encoding units 132 and 133) and perform turbo convolutional encoding.

<Step S16> The encoder 102 performs turbo convolutional encoding of each FEC block outputted from the FEC-block generator 101, and outputs the encoded FEC block to the interleaver 103.

<Step S17> The interleaver 103 performs interleaving of each encoded FEC block outputted from the encoder 102, and outputs the encoded and interleaved FEC block to the transmitter/receiver 105. Then, the transmitter/receiver 105 generates wireless-frame data by using the encoded and interleaved FEC block, and wirelessly transmits the wireless-frame data to the wireless base station 20 through the antenna 106.

As explained above, when the data transmission rate is low, the controller 101a makes the encoding units 110 and 130 unilaterally operate.

Further, the transmission rate can be lowered even in the case where each of the encoding units 110 and 130 has three or more element encoding units. In this case, it is possible to determine one of a plurality of levels to which the transmission rate can be lowered on the basis of a plurality of thresholds, and stop one or more element encoding units in each of the encoding units 110 and 130 according to the determined level of the transmission rate.

Figure 14:
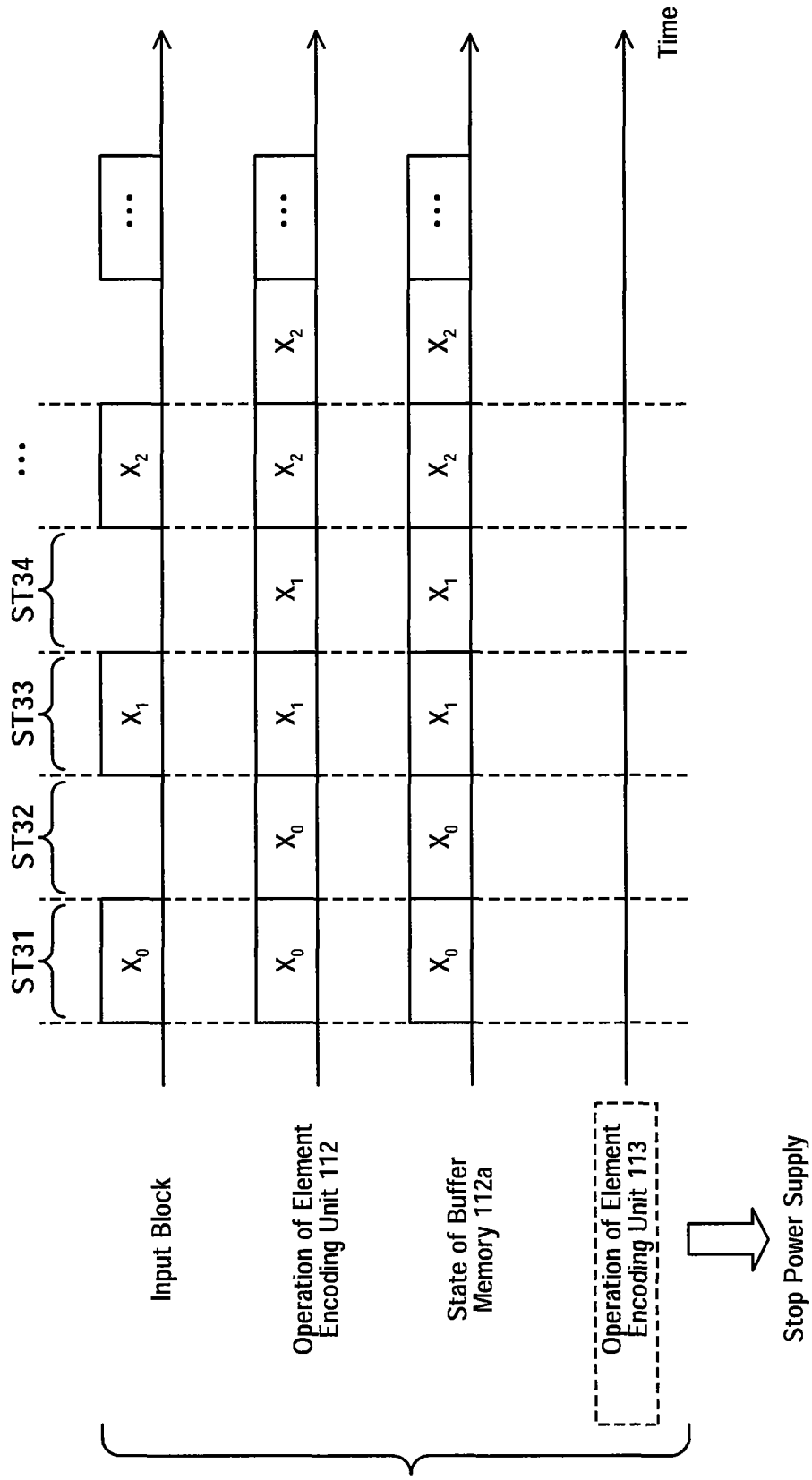
FIG. 14 is a timing diagram indicating the timings of operations for encoding performed by the encoding unit according to the second embodiment.

FIG. 14 is a timing diagram indicating the timings of operations for encoding performed by the encoding unit according to the second embodiment. The processing of FIG. 14 is explained below step by step.

<Step ST31> The switch unit 111 outputs the FEC block $X_0$ to the element encoding unit 112. Then, the element encoding unit 112 obtains the initial-state value $S_{c0}$ of the inputted FEC block $X_0$. At this time, the FEC block $X_0$ is held in the buffer memory 112a.

<Step ST32> The element encoding unit 112 acquires the FEC block $X_0$ from the buffer memory 112a, performs encoding of the FEC block $X_0$ by using the initial-state value $S_{c0}$ obtained in step ST31, and generates an element-encoded FEC block $Y_0$.

<Step ST33> The switch unit 111 outputs the FEC block $X_1$ to the element encoding unit 112. Then, the element encoding unit 112 obtains the initial-state value $S_{c1}$ of the inputted FEC block $X_1$. In addition, the FEC block $X_0$ is removed from the buffer memory 112a, and the newly inputted FEC block $X_1$ is held in the buffer memory 112a.

<Step ST34> The element encoding unit 112 acquires the FEC block $X_1$ from the buffer memory 112a, performs encoding of the FEC block $X_1$ by using the initial-state value $S_{c1}$ obtained in step ST33, and generates an element-encoded FEC block $Y_1$.

Thereafter, similar operations are performed until encoding of all the FEC blocks in the series X is completed.

As described above, when the transmission rate is low, the encoding processing by the element encoding units 113 and 133 can be dispensed with. That is, it is possible to unilaterally operate the encoding units 110 and 130. Therefore, when the transmission rate is low, the power supply to the element encoding units 113 and 133 can be stopped, so that the power consumption can be suppressed.

Although, in the above explanations, the element encoding units are assumed to have the structures in accordance with the aforementioned first example as illustrated in FIG. 5, it is possible to achieve similar advantages even when the element encoding units have the structures in accordance with the aforementioned second example as illustrated in FIG. 10.

Third Embodiment

The third embodiment is explained in detail below. The following explanations on the third embodiment are focused on only the differences from the first embodiment, and the explanations on the features of the third embodiment which are similar to the first embodiment are not repeated.

The wireless communication system according to the third embodiment can be realized by a configuration similar to the configuration of the first embodiment illustrated in FIG. 2. In addition, the mobile station according to the third embodiment can also be realized by a construction similar to the construction of the mobile station 100 illustrated in FIG. 3 except that the mobile station according to the third embodiment comprises the encoder 102b, which is different from the encoder 102 illustrated in FIG. 4.

Figure 15:
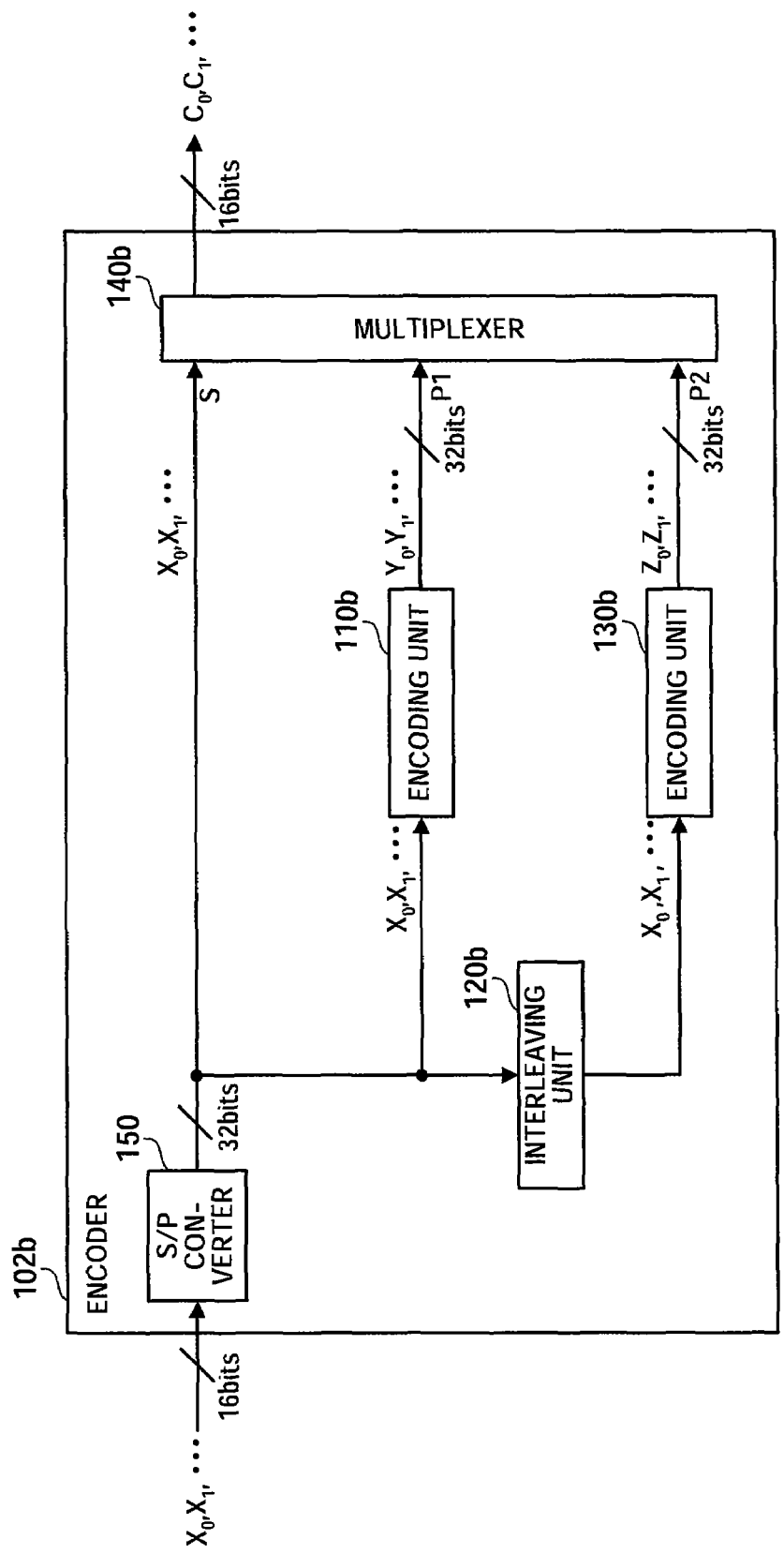
FIG. 15 is a block diagram illustrating the construction of an encoder according to the third embodiment.

FIG. 15 is a block diagram illustrating the construction of the encoder 102b according to the third embodiment. The encoder 102b comprises encoding units 110b and 130b, an interleaving unit 120b, a multiplexer 140b, and a serial-to-parallel converter 150. The constituent elements of the encoder 102b other than the serial-to-parallel converter 150 respectively have similar constructions to the corresponding constituent elements of the encoder 102 according to the first embodiment (illustrated in FIG. 4). However, the constituent elements of the encoder 102b can perform parallel processing of data signals having a bit width greater than the bit width of the data signals which the encoders 102 in the first and second embodiments can concurrently process.

The serial-to-parallel converter 150 expands the bit width of the FEC blocks outputted from the FEC-block generator 101 before the FEC blocks are inputted into the encoding unit 110b, the interleaving unit 120b, and the multiplexer 140b. For example, the FEC blocks outputted from the FEC-block generator 101 are inputted into the encoder 102b through a data transmission line having a bit width of 16 bits, and the serial-to-parallel converter 150 expands (doubles) the bit width to 32 bits.

Figure 16:
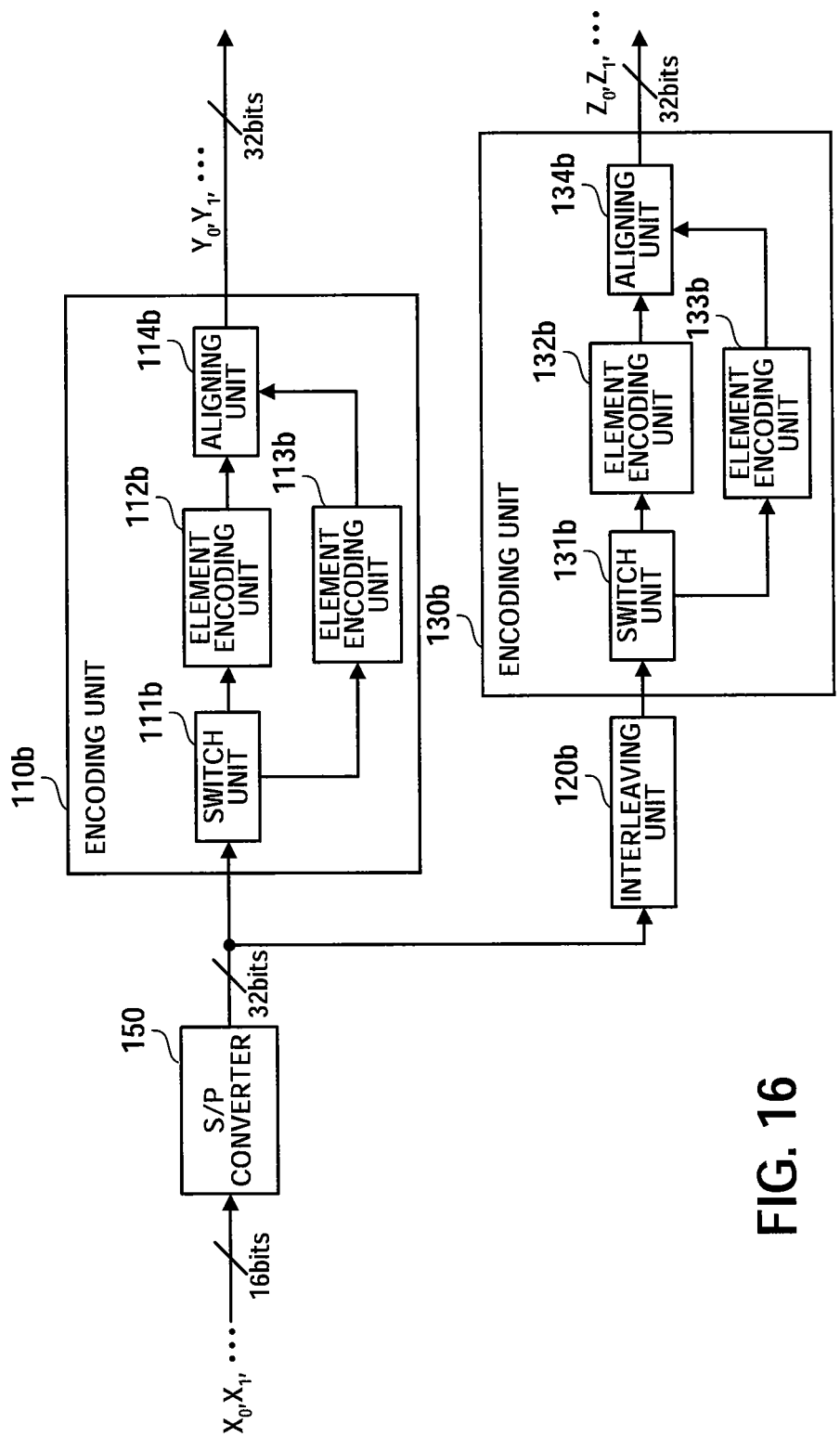
FIG. 16 is a block diagram illustrating the constructions of encoding units constituting the encoder according to the third embodiment.

In the following explanations on the third embodiment, the element encoding units 110b and 130b are assumed to have the structures in accordance with the aforementioned first example as illustrated in FIG. 5. FIG. 16 is a block diagram illustrating the constructions of the encoding units 110b and 130b constituting the encoder 102b having the structures in accordance with the aforementioned first example. (In FIG. 16, illustration of the multiplexer 140b and the input S (i.e., the FEC blocks $X_0, X_1, \ldots$) into the multiplexer 140b are omitted.) As illustrated in FIG. 16, the encoding unit 110b comprises a switch unit 111b, element encoding units 112b and 113b, and an aligning unit 114b, and the encoding unit 130b comprises a switch unit 131b, element encoding units 132b and 133b, and an aligning unit 134b. The constituent elements of the encoding unit 110b and the encoding unit 130b have functions respectively similar to the functions of the corresponding constituent elements of the encoding unit 110 and the encoding unit 130 in the first example of the encoding unit according to the first embodiment except that each of the constituent elements of the encoding unit 110b and the encoding unit 130b receive and process FEC blocks having the increased bit width, and output processed FEC blocks having the increased bit width.

Next, processing for encoding performed by the encoder 102b having the above construction is explained.

Figure 17:
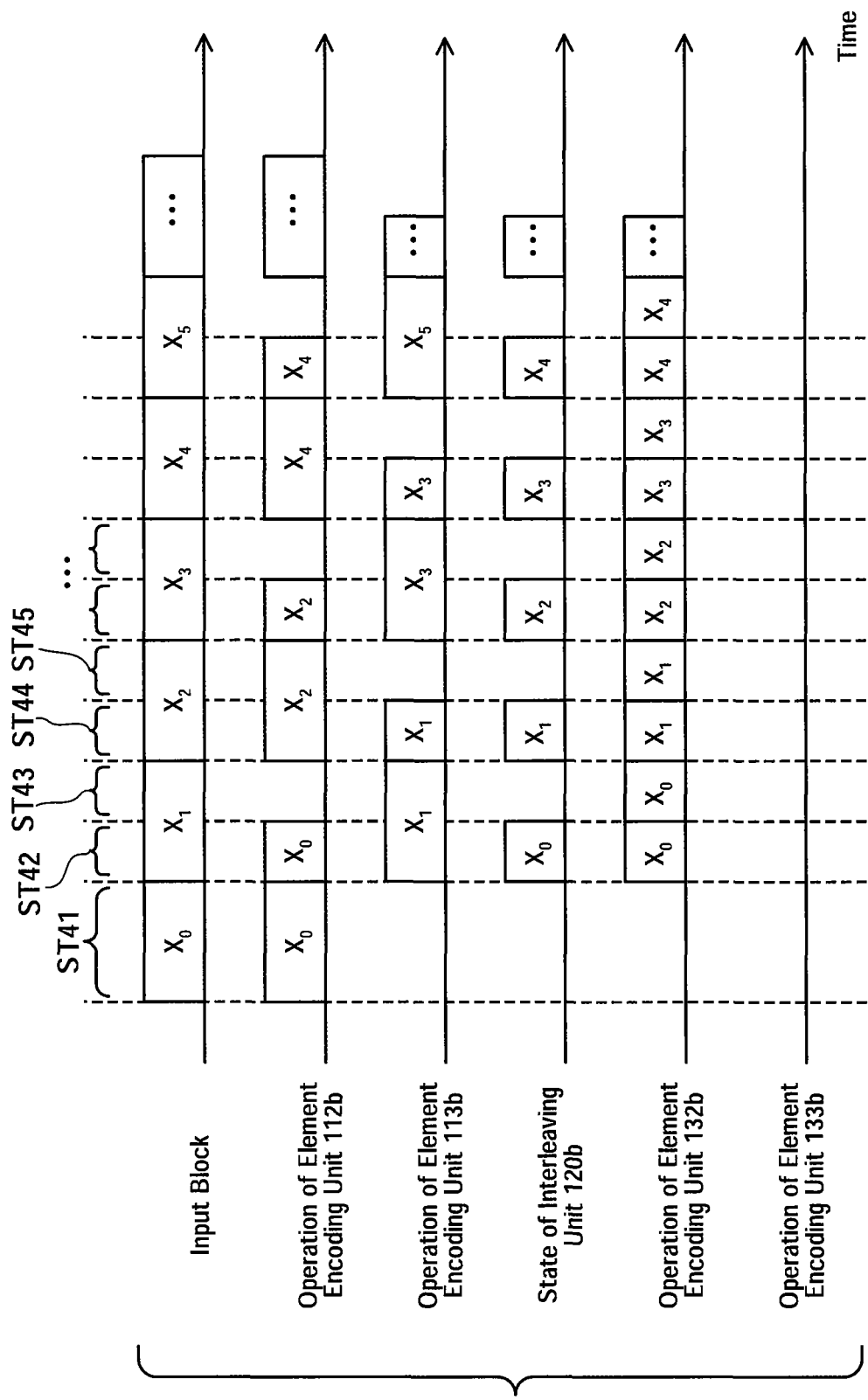
FIG. 17 is a timing diagram indicating the timings of operations for encoding performed by the encoding unit according to the third embodiment.

FIG. 17 is a timing diagram indicating the timings of operations for encoding performed by the encoding unit according to the third embodiment. In the following explanations on the third embodiment, the serial-to-parallel converter 150 is assumed to double (e.g., expand from 16 bits to 32 bits) the bit width of the data of each FEC block outputted from the FEC-block generator 101, and output the data of each FEC block with the doubled bit width, so that the bit width of the data supplied to the respective constituent elements of the encoder 102b is assumed to be twice the bit width of the data supplied to the respective constituent elements of the encoder 102 in the first and second embodiments. Even in this case, since the transmission rate of the data outputted from the FEC-block generator 101 is the same as the first and second embodiments, the time taken to input one FEC block into the encoder 102b through the serial-to-parallel converter 150 is the same as the time taken to input one FEC block into the encoder 102 in the first and second embodiments. However, since the constituent elements in the encoder 102b can perform processing for encoding or interleaving of data with the doubled bit width, the processing time in the third embodiment becomes half of the processing time in the first and second embodiments.

The processing of FIG. 17 is explained below step by step.

<Step ST41> The switch unit 111b outputs the FEC block $X_0$ to the element encoding unit 112b. The element encoding unit 112b obtains the initial-state value $S_{c0}$ of the inputted FEC block $X_0$. At this time, the FEC block $X_0$ is also inputted into the interleaving unit 120b. (Hereinafter, the inputs into the interleaving unit 120b are not described.)

<Step ST42> The switch unit 111b outputs the FEC block $X_1$ to the element encoding unit 113b. The element encoding unit 112b performs encoding of the FEC block $X_0$ by using the initial-state value $S_{c0}$ obtained in Step ST41, and generates an element-encoded block $Y_0$. The element encoding unit 113b obtains the initial-state value $S_{c1}$ of the inputted FEC block $X_1$. In addition, the interleaving unit 120b outputs the interleaved FEC block $X_0'$ to the encoding unit 130b. Then, the switch unit 131b outputs the interleaved FEC block $X_0'$ to the element encoding unit 132b. The element encoding unit 132b obtains the initial-state value $S_{c0}'$ of the interleaved FEC block $X_0'$.

<Step ST43> The switch unit 111b continues the output of the FEC block $X_1$ to the element encoding unit 113b. The element encoding unit 113b continues the operation for obtaining the initial-state value $S_{c1}$ from the FEC block $X_1$. The element encoding unit 132b performs the encoding of the FEC block $X_0'$ by using the initial-state value $S_{c0}'$ obtained in step ST42, and generates an element-encoded block $Z_0$.

<Step ST44> The switch unit 111b outputs the FEC block $X_2$ to the element encoding unit 112b. Then, the element encoding unit 112b obtains the initial-state value $S_{c2}$ of the inputted FEC block $X_2$. The element encoding unit 133b performs encoding of the FEC block $X_1$ by using the initial-state value $S_{c1}$ obtained in Step ST42, and generates an element-encoded block $Y_1$. The interleaving unit 120b outputs the interleaved FEC block $X_1'$ to the encoding unit 130b. Then, the switch unit 131b outputs the interleaved FEC block $X_1'$ to the element encoding unit 132b. The element encoding unit 132b obtains the initial-state value $S_{c1}'$ of the interleaved FEC block $X_1'$.

<Step ST45> The switch unit 111b continues the output of the FEC block $X_2$ to the element encoding unit 112b. The element encoding unit 112b continues the operation for obtaining the initial-state value $S_{c2}$ of the FEC block $X_2$. The element encoding unit 132b performs the encoding of the FEC block $X_1'$ by using the initial-state value $S_{c1}'$ obtained in step ST44.

Thereafter, similar operations are performed by the element encoding units 112b, 113b, and 132b until encoding of all the FEC blocks in the series X is completed.

Since the bit width which the constituent elements of the encoder 102 can concurrently handle is increased, for example, by a factor of two, the delay in the encoding processing by the element encoding units 112b and 113b can be reduced to 1.5 FEC blocks, and the delay in the encoding processing by the element encoding unit 132b can be reduced to one FEC block. That is, when the bit width is doubled according to the third embodiment, the delay in the encoding processing by the element encoding units 112b and 113b is 0.5 FEC blocks smaller than the first and second embodiments, and the delay in the encoding processing by the element encoding unit 132b is one FEC block smaller than the first and second embodiments.

Further, the difference between the timing of the input S (i.e., each of the FEC blocks $X_0, X_1, \ldots$) and the timing of the input P1 (i.e., the output of the encoding unit 110b) at the multiplexer 140b in the encoder 102b according to the third embodiment is 1.5 FEC blocks, which is 0.5 FEC blocks smaller than the difference in the encoder 102 according to the first or second embodiment. In addition, the difference between the timing of the input S and the timing of the input P2 (i.e., the output of the encoding unit 130b) at the multiplexer 140b in the encoder 102b according to the third embodiment is two FEC blocks, which is one FEC block smaller than the difference in the encoder 102 according to the first or second embodiment. Therefore, the capacity of the buffer memories for temporarily storing the inputs P1 and P2 can be reduced, so that the circuit size can be reduced.

Furthermore, the element encoding unit 133b in the encoding unit 130b in the encoder 102b is not used in the operations explained with reference to FIG. 17. Therefore, the power supply to the element encoding unit 133b can be stopped, or the element encoding unit 133b can be dispensed with.

Figure 18:
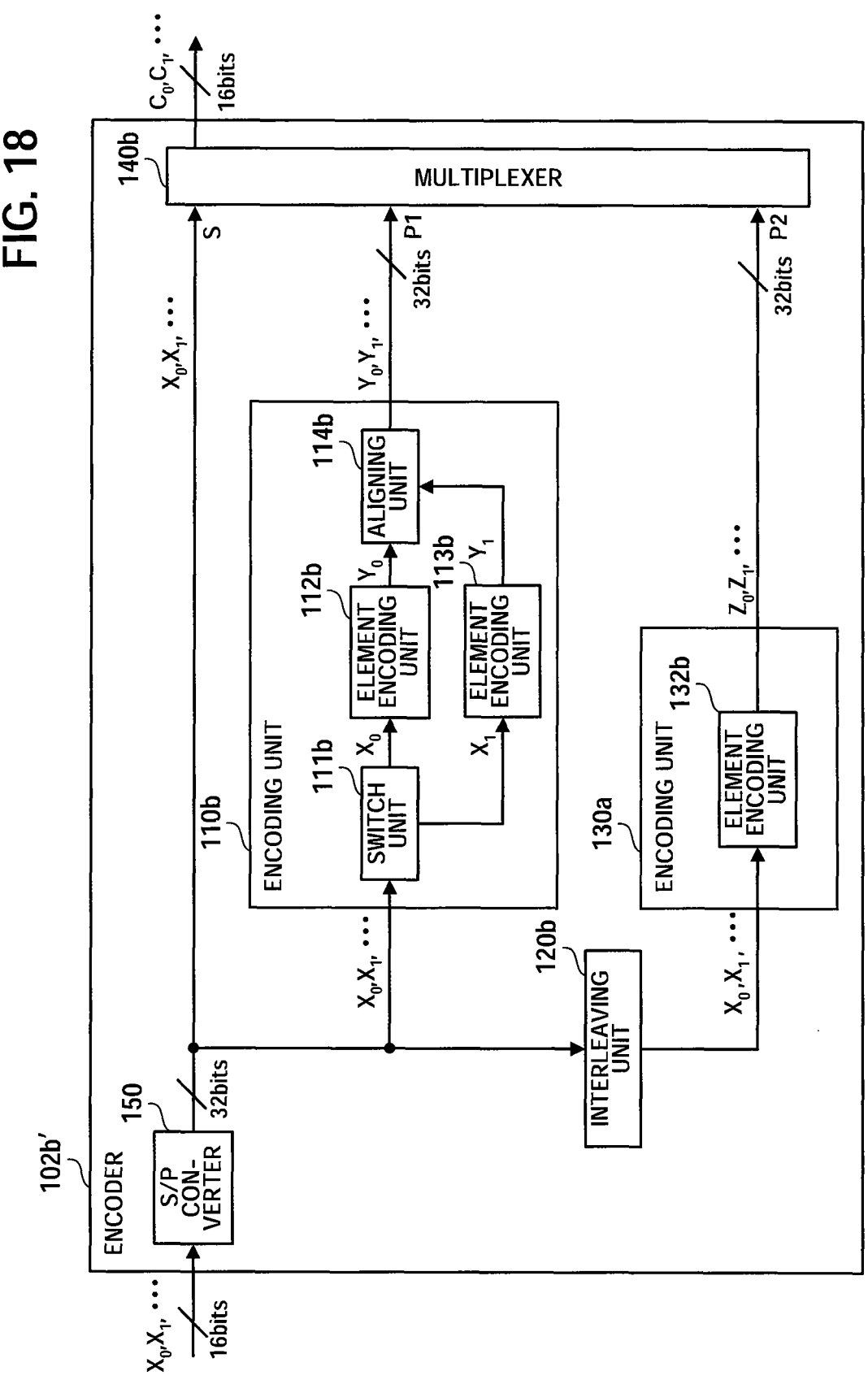

FIG. 18 is a block diagram illustrating the construction of a variation 102b' of the encoder 102b according to the third embodiment in which a part of the element encoding units is dispensed with. As explained with reference to FIG. 18, the turbo convolutional encoding can be performed in the encoder 102b' without using the element encoding unit 133b. Therefore, the element encoding unit 133b can be dispensed with as in the encoder 102b' illustrated in FIG. 18. The circuit size and the power consumption of the encoder 102b' illustrated in FIG. 18 are small, compared with the encoder 102b illustrated in FIG. 16.

Although, in the above explanations on the third embodiment, the element encoding units 110b and 130b are assumed to have the structures in accordance with the aforementioned first example illustrated in FIG. 5, it is possible to achieve advantages similar to the advantages explained with reference to FIGS. 17 and 18 even when the element encoding units have the structures in accordance with the aforementioned second example illustrated in FIG. 10.

Advantage of Embodiments

According to the encoders, the transmission device, and the encoding process described above, it is possible to efficiently increase the throughput of the convolutional encoding.

Additional Matters

Although the mobile communication system is taken as examples for explaining the embodiments, the disclosed embodiments can also be used in other types of communication systems including other types of wireless communication systems and fixed communication systems.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. An encoder for successively receiving a plurality of data blocks and encoding each of the plurality of data blocks, the encoder comprising:
a plurality of element encoding units which determine initial states of the plurality of element encoding units in accordance with the plurality of data blocks, and encode the plurality of data blocks on the basis of the initial states; and
a switch unit which distributes the different received data blocks among the different element encoding units, the switch unit being configured to stop operation of part of the plurality of element encoding units when the amount of data blocks received by the encoder per unit time is smaller than a specified threshold.

2. The encoder according to claim 1, further comprising a conversion unit which receives a first signal having a first bit width and representing the plurality of data blocks into a second signal having a second bit width and representing the plurality of data blocks, the first bit width is smaller than the second bit width, and each of the element encoding units performs processing of bits in the second bit width in parallel.

3. The encoder according to claim 1, wherein each of the element encoding units performs operations of determining the initial states and operations of encoding the plurality of data blocks in a time shared manner.

4. The encoder according to claim 1, wherein each of the element encoding units comprises a first calculation unit which determines the initial states and a second calculation unit which acquires the initial states from the first calculation unit and encodes the plurality of data blocks.

5. The encoder according to claim 1, wherein each of the element encoding units performs preliminary encoding of each of the plurality of data blocks, determines a final state of each of the element encoding units and discards a result of the preliminary encoding, and determines the initial state on the basis of the final state.

6. The encoder according to claim 1, further comprising an aligning unit which arranges encoded data blocks which are outputted from the plurality of element encoding units, into an order corresponding to an order in which the plurality of data blocks are received by the encoder.

7. An encoder for successively receiving a plurality of data blocks and encoding each of the plurality of data blocks, the encoder comprising:
a first encoding unit and a second encoding unit each including,
a plurality of element encoding units which determine initial states of the plurality of element encoding units in accordance with the plurality of data blocks, and encode the plurality of data blocks on the basis of the initial states, and
a switch unit which distributes the different received data blocks among the different element encoding units in a time shared manner, the switch unit being configured to stop operation of part of the plurality of element encoding units when the amount of data blocks received by the encoder per unit time is smaller than a specified threshold;
an interleaving unit which performs interleaving of the plurality of data blocks before the plurality of data blocks are inputted into the second encoding unit; and
a multiplexer which arranges encoded data blocks outputted from the first encoding unit and the second encoding unit, into an order corresponding to an order in which the plurality of data blocks are received by the encoder.

8. A transmission device for encoding and successively transmitting data in data blocks, the transmission device comprising:
a first encoding unit and a second encoding unit each including,
a plurality of element encoding units which determine initial states of the plurality of element encoding units in accordance with a plurality of data blocks inputted into the transmission device, and encode the plurality of data blocks on the basis of the initial states, and
a switch unit which distributes the different inputted data blocks among the different element encoding units, the switch unit being configured to stop operation of part of the plurality of element encoding units when the amount of data blocks inputted into the transmission device per unit time is smaller than a specified threshold;
an interleaving unit which performs interleaving of the plurality of data blocks before the plurality of data blocks are inputted into the second encoding unit;
a multiplexer which arranges encoded data blocks outputted from the first encoding unit and the second encoding unit, into an order corresponding to an order in which the plurality of data blocks are inputted into the transmission device; and
a transmitter which modulates and transmits the encoded data blocks outputted from the multiplexer.

9. A process for successively receiving a plurality of data blocks and encoding each of the plurality of data blocks in an encoder having a plurality of element encoding units, the process comprising:
- distributing the different received data blocks among the different element encoding units;
- determining, in the plurality of element encoding units, initial values in accordance with the distributed data blocks;
- encoding, in the plurality of element encoding units, the distributed data blocks on the basis of the initial values; and
- stopping operation of part of the plurality of element encoding units when the amount of data blocks received per unit time is smaller than a specified threshold.

* * * * *